United States Patent
Choi et al.

(10) Patent No.: US 10,142,738 B2
(45) Date of Patent: Nov. 27, 2018

(54) PANEL VIBRATION TYPE SOUND-GENERATING DISPLAY DEVICE

(71) Applicant: LG DISPLAY CO., LTD., Seoul (KR)

(72) Inventors: YeongRak Choi, Gyeonggi-do (KR); Sungtae Lee, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/471,155

(22) Filed: Mar. 28, 2017

(65) Prior Publication Data

US 2017/0280249 A1 Sep. 28, 2017

(30) Foreign Application Priority Data

| | | |
|---|---|---|
| Mar. 28, 2016 | (KR) | 10-2016-0037118 |
| Apr. 4, 2016 | (KR) | 10-2016-0040885 |
| Apr. 5, 2016 | (KR) | 10-2016-0041384 |
| May 30, 2016 | (KR) | 10-2016-0066455 |
| May 31, 2016 | (KR) | 10-2016-0067431 |
| Jun. 30, 2016 | (KR) | 10-2016-0083122 |
| Nov. 30, 2016 | (KR) | 10-2016-0161789 |
| Nov. 30, 2016 | (KR) | 10-2016-0162189 |
| Dec. 30, 2016 | (KR) | 10-2016-0183867 |

(51) Int. Cl.
| | |
|---|---|
| H04R 9/06 | (2006.01) |
| H04R 1/02 | (2006.01) |
| H04R 5/02 | (2006.01) |

(52) U.S. Cl.
CPC ............ H04R 9/066 (2013.01); H04R 5/023 (2013.01); H04R 2499/15 (2013.01)

(58) Field of Classification Search
CPC ....... H04R 5/02; H04R 2499/15; H04R 9/066

USPC ............................................ 381/333, 306, 388
See application file for complete search history.

(56) References Cited

U.S. PATENT DOCUMENTS

| | | |
|---|---|---|
| 4,891,842 A | 1/1990 | Green |
| 5,025,474 A | 6/1991 | Tanaka et al. |
| 5,796,854 A | 8/1998 | Markow |
| 6,137,890 A | 10/2000 | Markow |
| 6,208,237 B1 | 3/2001 | Saiki et al. |
| 6,238,755 B1 | 5/2001 | Harvey et al. |

(Continued)

FOREIGN PATENT DOCUMENTS

| | | |
|---|---|---|
| CN | 1547416 A | 11/2004 |
| CN | 102946577 A | 2/2013 |

(Continued)

OTHER PUBLICATIONS

Communication dated Jun. 30, 2017 from the European Patent Office in related European application No. 16181195.5.

(Continued)

*Primary Examiner* — Disler Paul
(74) *Attorney, Agent, or Firm* — Morgan, Lewis & Bockius LLP

(57) ABSTRACT

Provided is a panel vibration type sound-generating display device. A display device includes: a display panel configured to display an image, a cover bottom configured to cover the display panel, a sound-generating actuator supported by the cover bottom, the sound-generating actuator configured to vibrate the display panel to generate sound, and a sealing member between an outer peripheral portion of the sound-generating actuator and an outer surface of the cover bottom.

18 Claims, 24 Drawing Sheets

(56) References Cited

U.S. PATENT DOCUMENTS

| | | |
|---|---|---|
| 6,342,831 B1 | 1/2002 | Azima |
| 6,443,586 B1 | 9/2002 | Azima et al. |
| 6,610,237 B2 | 8/2003 | Azima et al. |
| 6,618,487 B1 | 9/2003 | Azima et al. |
| 6,677,384 B1 | 1/2004 | Ikemoto et al. |
| 6,751,329 B2 | 6/2004 | Colloms et al. |
| 6,795,561 B1 | 9/2004 | Bank |
| 6,826,285 B2 | 11/2004 | Azima |
| 6,871,149 B2 | 3/2005 | Sullivan et al. |
| 6,911,901 B2 | 6/2005 | Bown |
| 6,922,642 B2 | 7/2005 | Sullivan |
| 6,937,124 B1 | 8/2005 | Nakamura et al. |
| 6,956,957 B1 * | 10/2005 | Azima ............ H04R 9/06 181/169 |
| 6,985,596 B2 | 1/2006 | Bank et al. |
| 7,020,302 B2 | 3/2006 | Konishi et al. |
| 7,050,600 B2 | 5/2006 | Saiki et al. |
| 7,120,264 B2 | 10/2006 | Saiki et al. |
| 7,157,649 B2 | 1/2007 | Hill |
| 7,158,651 B2 | 1/2007 | Bachmann et al. |
| 7,174,025 B2 | 2/2007 | Azima et al. |
| 7,184,898 B2 | 2/2007 | Sullivan et al. |
| 7,215,329 B2 | 5/2007 | Yoshikawa et al. |
| 7,305,248 B2 | 12/2007 | Mori |
| 7,372,110 B2 | 5/2008 | Hatano |
| 7,376,523 B2 | 5/2008 | Sullivan et al. |
| 7,382,890 B2 | 6/2008 | Saiki et al. |
| 7,536,211 B2 | 5/2009 | Saiki et al. |
| 7,545,459 B2 | 6/2009 | Fujiwara et al. |
| 7,564,984 B2 | 7/2009 | Bank et al. |
| 7,570,771 B2 | 8/2009 | Whitwell et al. |
| 7,593,159 B2 | 9/2009 | Yokoyama et al. |
| 7,657,042 B2 | 2/2010 | Miyata |
| 7,764,803 B2 | 7/2010 | Kang |
| 7,769,191 B2 * | 8/2010 | Lee ............... H04R 1/26 381/152 |
| 7,800,702 B2 | 9/2010 | Tsuboi et al. |
| 7,903,091 B2 | 3/2011 | Lee et al. |
| 8,174,495 B2 | 5/2012 | Takashima et al. |
| 8,174,511 B2 | 5/2012 | Takenaka et al. |
| 8,180,074 B2 | 5/2012 | Ko et al. |
| 8,194,894 B2 | 6/2012 | Burton et al. |
| 8,274,480 B2 | 9/2012 | Sullivan |
| 8,736,558 B2 | 5/2014 | East et al. |
| 8,830,211 B2 | 9/2014 | Hill |
| 8,879,766 B1 * | 11/2014 | Zhang ............ H04R 1/028 381/333 |
| 8,917,168 B2 | 12/2014 | Kono et al. |
| 8,934,228 B2 | 1/2015 | Franklin et al. |
| 9,001,060 B2 | 4/2015 | Harris |
| 9,030,447 B2 | 5/2015 | Hsu |
| 9,035,918 B2 | 5/2015 | Harris et al. |
| 9,041,662 B2 | 5/2015 | Harris |
| 9,046,949 B2 | 6/2015 | Adachi et al. |
| 9,107,006 B2 | 8/2015 | Wang et al. |
| 9,122,011 B2 | 9/2015 | Oh et al. |
| 9,137,592 B2 | 9/2015 | Yliaho et al. |
| 9,148,716 B2 | 9/2015 | Liu et al. |
| 9,173,014 B2 | 10/2015 | Park |
| 9,191,749 B2 | 11/2015 | Nabata et al. |
| 9,197,966 B2 | 11/2015 | Umehara et al. |
| 9,204,223 B2 | 12/2015 | Nabata et al. |
| 9,285,882 B2 | 3/2016 | Wang et al. |
| 9,288,564 B2 | 3/2016 | Faerstain et al. |
| 9,300,770 B2 | 3/2016 | Nabata et al. |
| 9,317,063 B2 | 4/2016 | Kwon et al. |
| 9,332,098 B2 | 5/2016 | Horii |
| 9,350,832 B2 | 5/2016 | Horii |
| 9,357,280 B2 | 5/2016 | Mellow et al. |
| 9,363,591 B2 | 6/2016 | Ozasa et al. |
| 9,363,607 B2 | 6/2016 | Ando |
| 9,380,366 B2 | 6/2016 | Kang et al. |
| 9,389,688 B2 | 7/2016 | Tossavainen et al. |
| 9,398,358 B2 | 7/2016 | Louh |
| 9,436,320 B2 | 9/2016 | Kang et al. |
| 9,544,671 B2 | 1/2017 | Shi et al. |
| 9,609,438 B2 | 3/2017 | Kim et al. |
| 9,654,863 B2 | 5/2017 | Crosby et al. |
| 2001/0040976 A1 | 11/2001 | Buos |
| 2001/0043714 A1 | 11/2001 | Asada et al. |
| 2002/0018574 A1 * | 2/2002 | Okuno ............ H04R 11/02 381/333 |
| 2003/0233794 A1 | 12/2003 | Pylkki et al. |
| 2005/0129258 A1 | 6/2005 | Fincham |
| 2005/0129265 A1 | 6/2005 | Nakajima et al. |
| 2006/0018503 A1 | 1/2006 | Endo |
| 2006/0078153 A1 | 4/2006 | Sato |
| 2006/0120542 A1 * | 6/2006 | Lee ............... H04R 7/045 381/152 |
| 2006/0126885 A1 | 6/2006 | Combest |
| 2006/0140439 A1 | 6/2006 | Nakagawa |
| 2007/0019134 A1 | 1/2007 | Park et al. |
| 2007/0036388 A1 | 2/2007 | Lee et al. |
| 2007/0187172 A1 | 8/2007 | Kaneda et al. |
| 2007/0206822 A1 * | 9/2007 | Whitwell ............ H04R 1/24 381/152 |
| 2007/0290609 A1 | 12/2007 | Ishii et al. |
| 2009/0034174 A1 | 2/2009 | Ko et al. |
| 2009/0034759 A1 * | 2/2009 | Ko ............... H04N 5/642 381/152 |
| 2009/0097692 A1 | 4/2009 | Sakamoto |
| 2009/0247237 A1 | 10/2009 | Mittleman et al. |
| 2009/0267891 A1 | 10/2009 | Ali |
| 2012/0034541 A1 | 2/2012 | Muraoka et al. |
| 2012/0242592 A1 | 9/2012 | Rothkopf et al. |
| 2012/0243719 A1 | 9/2012 | Franklin et al. |
| 2012/0274570 A1 | 11/2012 | Kim |
| 2013/0089231 A1 | 4/2013 | Wilk et al. |
| 2013/0106868 A1 | 5/2013 | Shenoy |
| 2014/0029777 A1 | 1/2014 | Jang |
| 2014/0049522 A1 | 2/2014 | Mathew et al. |
| 2014/0145836 A1 | 5/2014 | Tossavainen et al. |
| 2014/0146093 A1 | 5/2014 | Sako et al. |
| 2014/0197380 A1 | 7/2014 | Sung et al. |
| 2014/0326402 A1 | 11/2014 | Lee et al. |
| 2014/0334078 A1 | 11/2014 | Lee et al. |
| 2015/0010187 A1 | 1/2015 | Lee et al. |
| 2015/0016658 A1 | 1/2015 | Lee |
| 2015/0062101 A1 | 3/2015 | Kim et al. |
| 2015/0078604 A1 | 3/2015 | Seo et al. |
| 2015/0119834 A1 | 4/2015 | Locke et al. |
| 2015/0138157 A1 | 5/2015 | Harris et al. |
| 2015/0195630 A1 | 7/2015 | Yliaho et al. |
| 2015/0341714 A1 * | 11/2015 | Ahn ............... G06F 1/1688 381/333 |
| 2015/0350775 A1 | 12/2015 | Behles et al. |
| 2016/0011442 A1 | 1/2016 | Lee et al. |
| 2016/0050472 A1 | 2/2016 | Lee et al. |
| 2016/0165327 A1 * | 6/2016 | Crosby ............ H04R 1/2811 381/332 |
| 2016/0212513 A1 | 7/2016 | Honda et al. |
| 2016/0261966 A1 | 9/2016 | Won |
| 2017/0070811 A1 | 3/2017 | Mihelich et al. |
| 2017/0280216 A1 | 9/2017 | Lee et al. |

FOREIGN PATENT DOCUMENTS

| | | |
|---|---|---|
| CN | 105096778 A | 11/2015 |
| EP | 1 507 438 A2 | 2/2005 |
| EP | 1881731 A1 | 1/2008 |
| EP | 2947857 A2 | 11/2015 |
| JP | 55-25284 A | 2/1980 |
| JP | 2696801 B2 | 1/1998 |
| JP | H11-44891 A | 2/1999 |
| JP | 2001-61194 A | 3/2001 |
| JP | 2002-511681 A | 4/2002 |
| JP | 2002-264646 A | 9/2002 |
| JP | 2003-211087 A | 7/2003 |
| JP | 3578244 B2 | 10/2004 |
| JP | 2004-343362 A | 12/2004 |
| JP | 2005-175553 A | 6/2005 |
| JP | 2005-244804 A | 9/2005 |
| JP | 2006-138149 A | 6/2006 |

(56) References Cited

FOREIGN PATENT DOCUMENTS

| | | |
|---|---|---|
| JP | 2006-186590 A | 7/2006 |
| JP | 2006-319626 A | 11/2006 |
| JP | 2006-325079 A | 11/2006 |
| JP | 3896675 B2 | 3/2007 |
| JP | 2007-267302 A | 10/2007 |
| JP | 2007-528648 A | 10/2007 |
| JP | 2007-300578 A | 11/2007 |
| JP | 2009-100223 A | 5/2009 |
| JP | 2009100223 A | 5/2009 |
| JP | 2009-302924 A | 12/2009 |
| JP | 2010-027845 A | 2/2010 |
| JP | 2010-081142 A | 4/2010 |
| JP | 4449605 B2 | 4/2010 |
| JP | 2012-129247 A | 7/2012 |
| JP | 2012-198407 A | 10/2012 |
| JP | 5060443 B2 | 10/2012 |
| JP | 2013-044912 A | 3/2013 |
| JP | 2013-102360 A | 5/2013 |
| JP | 2014-509028 A | 4/2014 |
| JP | 2014-220237 A | 11/2014 |
| JP | 2014-220802 A | 11/2014 |
| JP | 2015-219528 A | 12/2015 |
| KR | 10-2008-0002228 A | 1/2008 |
| KR | 2008-063698 A | 7/2008 |
| KR | 10-1026987 B1 | 4/2011 |
| KR | 10-1061519 B1 | 9/2011 |
| KR | 10-1404119 B1 | 6/2014 |
| KR | 101410393 B2 | 6/2014 |
| KR | 2015-0005089 A | 1/2015 |
| KR | 10-2015-0031641 A | 3/2015 |
| KR | 10-1499514 B1 | 3/2015 |
| KR | 10-2015-0131428 A | 11/2015 |
| KR | 2015-133918 A | 12/2015 |
| KR | 10-2017-0135673 A | 12/2017 |
| TW | 200706049 A | 2/2007 |
| TW | M451766 U | 4/2013 |
| TW | 201319783 A | 5/2013 |
| TW | 201503710 A | 1/2015 |
| TW | 201545559 A | 12/2015 |
| WO | 99/52322 A1 | 10/1999 |
| WO | 2005/089014 A1 | 9/2005 |
| WO | 2009/017280 A1 | 2/2009 |
| WO | 2012/129247 A2 | 9/2012 |
| WO | 2015-046288 A1 | 4/2015 |
| WO | 2016/002230 A1 | 1/2016 |

OTHER PUBLICATIONS

USPTO Office Action dated Sep. 8, 2017 in related U.S. Appl. No. 15/374,566.
USPTO Office Action dated Oct. 26, 2017 in related U.S. Appl. No. 15/471,458.
USPTO Office Action dated Nov. 9, 2017 in related U.S. Appl. No. 15/471,173.
USPTO Office Action dated Aug. 10, 2017 in related U.S. Appl. No. 15/340,709.
USPTO Office Action dated Oct. 13, 2017 in related U.S. Appl. No. 15/471,184.
Hermida, Alfred, "PC Screen Turns Into Speaker," BBC News, Technology, Mar. 31, 2003, pp. 1-2.
Extended European Search Report issued in European Application No. 17183078.9 dated Jan. 16, 2018.
Extended European Search Report issued in European Application No. 17184428.5 dated Jan. 23, 2018.
Extended European Search Report issued in European Application No. 17184429.3 dated Jan. 26, 2018.
Japanese Office Action issued in Japanese Application No. 2016-216426 dated Nov. 24, 2017.
Taiwanese Office Action issued in Taiwanese Application No. 10720014270 dated Jan. 10, 2018.
Taiwanese Office Action issued in Taiwanese Application No. 10621325350 dated Jan. 3, 2018.
Office Action dated Mar. 27, 2017, from the Korean Patent Office in related Application No. 10-2016-0146951.
Office Action dated Sep. 26, 2017 from the Japanese Patent Office in related Japanese application No. 2016-190615.
Office Action dated Oct. 3, 2017 from the Japanese Patent Office in related Japanese application No. 2016-235794.
Communication dated Sep. 19, 2017 from the European Patent Office in related European application No. 16181185.6.
Communication dated Sep. 5, 2017 from the European Patent Office in related European application No. 16181191.4.
Office Action dated May 31, 2017, from the Taiwanese Patent Office in related Taiwanese Patent Application No. 106121605.
Taiwanese Office Action dated May 15, 2018, issued in Taiwanese Application No. 106122586.
Japanese Office Action dated Jul. 3, 2018, issued in Japanese Application No. 2016-235794.
Japanese Office Action dated Jun. 5, 2018, issued in Japanese Application No. 2017-131154.
Japanese Office Action dated Aug. 23, 2018, issued in Japanese Application No. 2017-137757.
Japanese Office Action dated Aug. 23, 2018, issued in Japanese Application No. 2017-124022.
Japanese Office Action dated Sep. 25, 2018, issued in Japanese Application No. 2017-131143.

* cited by examiner

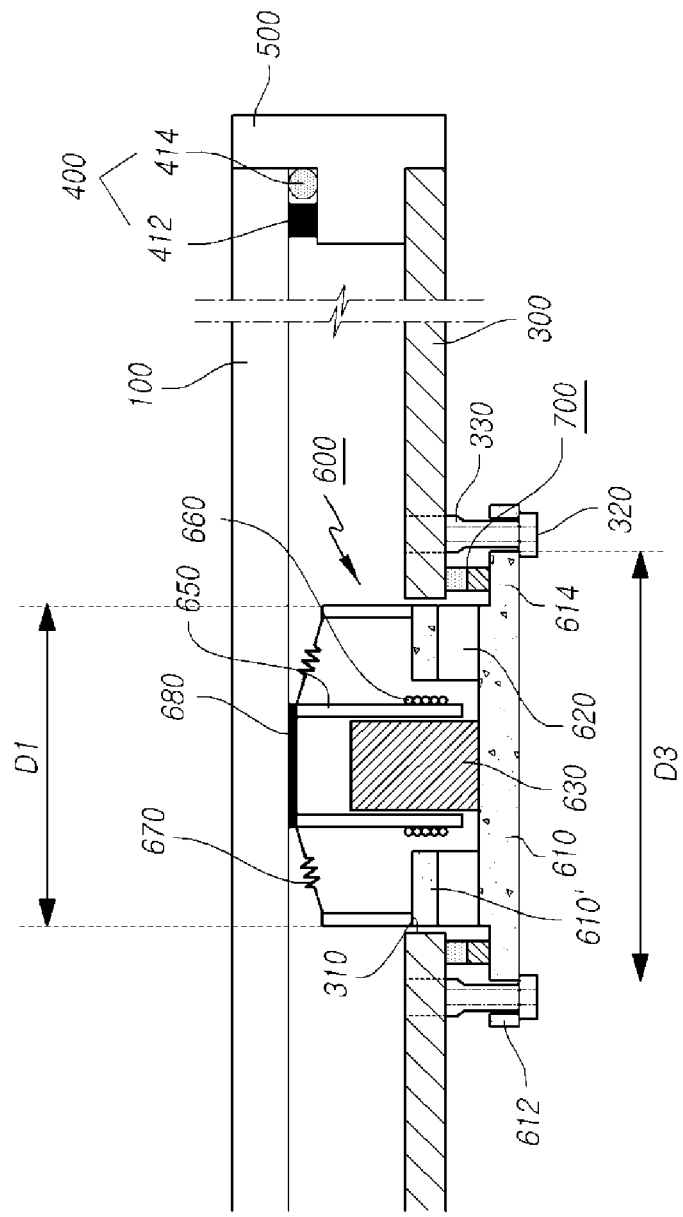

PANEL VIBRATION TYPE SOUND-GENERATING DISPLAY DEVICE

CROSS-REFERENCE TO RELATED APPLICATIONS

This application claims the priority of Korean Application No. 10-2016-0037118, filed Mar. 28, 2016, Korean Application No. 10-2016-0040885, filed Apr. 4, 2016, Korean Application No. 10-2016-0041384, filed Apr. 5, 2016, Korean Application No. 10-2016-0066455, filed May 30, 2016, Korean Application No. 10-2016-0067431, filed May 31, 2016, Korean Application No. 10-2016-0083122, filed Jun. 30, 2016, Korean Application No. 10-2016-0161789, filed Nov. 30, 2016, Korean Application No. 10-2016-0162189, filed Nov. 30, 2016, and Korean Application No. 10-2016-0183867, filed Dec. 30, 2016, all of which are hereby incorporated by reference.

BACKGROUND

1. Technical Field

The present disclosure relates to a display device and, more particularly, to a display device that generates sound by vibrating a display panel.

2. Discussion of the Related Art

With the development of various portable electronic devices, such as a mobile communication terminal and a notebook computer, a desire for a flat panel display device applicable thereto is increasing. The flat panel display devices include a liquid crystal display (LCD) device, an electroluminescence display device, a light-emitting diode (LED) display device, and an organic light-emitting diode (OLED) display device.

Among these display devices, the liquid crystal display (LCD) device includes an array substrate including an array of thin film transistors, an upper substrate including a color filter and/or a black matrix, etc., and a liquid crystal material layer formed therebetween. An alignment state of the liquid crystal is controlled according to an electric field applied between two electrodes of a pixel area, and thereby, the transmittance of light is adjusted to display images.

In a display panel of such a liquid crystal display device, an active area (AA) configured to provide an image to a user and a non-active area (NA), which is a peripheral area of the active area, are defined. The display panel is usually manufactured by attaching a first substrate, which is an array substrate having a thin film transistor formed therein to define a pixel area, and a second substrate, which is an upper substrate having a black matrix and/or color filter layer formed thereon, to each other. The array substrate or first substrate, on which a thin film transistor is formed, includes a plurality of gate lines extending in a first direction and a plurality of data lines extending in a second direction perpendicular to the first direction. One pixel area is defined by each gate line and each data line. One or more thin film transistors are formed in one pixel area, and gate and source electrodes of each thin film transistor may be respectively connected to a gate line and a data line.

Among these display devices, the liquid crystal display device does not have its own light-emitting element, and thus needs a separate light source. Therefore, the liquid crystal display device has a back-light unit having a light source, such as an LED, which is arranged at the rear surface thereof and irradiates a light toward a front surface of the liquid crystal panel thereof, thereby implementing a recognizable image.

Recently, an organic light-emitting diode (OLED) display device coming into the spotlight as a display device has advantages of a fast response time, high light-emitting efficiency, high luminance, and a wide viewing angle by using an OLED that emits light by itself, i.e., is "self-emitting." In the OLED display device, sub-pixels including organic light-emitting diodes are arranged in a matrix form, and the brightness of sub-pixels selected by a scan signal is controlled according to a grayscale of data. Further, the OLED display device, which is an emissive element, consumes a small amount of power and has a high response speed, a high light-emitting efficiency, a high luminance, and a wide viewing angle.

Meanwhile, a set device or a finished product including such a display device as described above may include, for example, a television (TV), a computer monitor, or an advertising panel. Such a display device or set device may include a sound output device, such as a speaker, for generating and outputting sound relating to a displayed image.

Typically, a company that manufactures a display portion of a device, such as a liquid crystal display device or an organic light-emitting diode display device, manufactures only a display panel or a display device, while another company that manufactures a speaker assembles the speaker with the manufactured display portion, to complete a set device capable of outputting images and sound. The reverse assembly may also be done, but still in two parts and often in different manufacturing facilities.

FIG. 1 is a plan view of a speaker included in a related art display device.

As shown in FIG. 1, the related art display device 1 or a set device includes a speaker 2 disposed on a rear part or a lower part of a display panel thereof. In this structure, the sound generated by the speaker 2 does not progress directly toward a viewer, who is viewing an image from the front side of the display device 1, but progresses toward the rear part, the lower part, or the edge of the display panel, rather than the front part of the display panel on which the image is being displayed. Therefore, the sound's mismatched directionality may disturb the viewer's immersion experience. In addition, when the sound generated from the speaker 2 progresses toward the rear part, the lower part, or the edge of the display panel of the display panel, the sound quality may be degraded due to an interference with sound reflected by walls, floors, or other surfaces at the rear of or below the display panel.

In addition, the sound generated by a speaker included in the related art display device is not oriented toward a viewer of the display device, and may thus undergo diffraction, which further degrades the sound localization. Moreover, in configuring a set device, such as a TV, a speaker may occupy an undesirably large amount of space, which imposes a restriction on the design and spatial disposition of the set device. In mobile devices, for example, the speaker takes up space that forces a larger size in thickness and/or bezel area.

Therefore, there has been an increasing desire for a technology which can improve the quality of sound output from a display device and reduce the viewer's immersion experience from being disturbed. According to such a need, a technique for generating sound by directly vibrating a display panel of a display device has recently been developed.

Such a panel vibration type sound-generating device may have a configuration in which a sound-generating actuator is fixedly inserted into a support hole formed in a cover bottom or the like, which is a rear support structure of a display device. In this case, generated sound leaks out through the support hole formed in the cover bottom, which may degrade a sound-generating characteristic, and the leaked sound may be reflected from a rear wall so that the reflected sound is output to the front side where a viewer is positioned, which may cause the sound quality to be deteriorated due to sound interference.

SUMMARY

Accordingly, the present disclosure is directed to a panel vibration type sound-generating display device that substantially obviates one or more of the problems due to limitations and disadvantages of the related art.

An aspect of the present disclosure is to provide a panel vibration type display device capable of generating sound by vibrating a display panel constituting the display device.

Another aspect of the present disclosure is to provide a display device that is capable of reducing the thickness of the display device while allowing the display device to have an improved sound-generating performance.

Another aspect of the present disclosure is to provide a display device that is capable of reducing sound leakage through a support hole, such that sound output characteristics can be improved.

Another aspect of the present disclosure is to provide a display device that is capable of reducing the occurrence of a noise when the sealing member comes in contact with the cover bottom while reducing sound leakage.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, a display device may include: a display panel configured to display an image, a cover bottom configured to cover the display panel, a sound-generating actuator supported by the cover bottom, the sound-generating actuator configured to vibrate the display panel to generate sound, and a sealing member between an outer peripheral portion of the sound-generating actuator and an outer surface of the cover bottom.

Furthermore, a display device may include: a display panel configured to display an image, a cover bottom configured to cover the display panel, and a sound-generating actuator supported by the cover bottom, the sound-generating actuator having a tip end configured to vibrate the display panel to generate sound.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

FIG. 2A is a plan view. FIG. 2B is a cross-sectional view of FIG. 2A taken along line I-I'.

FIG. 11A is a cross-sectional view of a display device including a sound-generating actuator and a sealing member according to an embodiment of the present disclosure.

Figure 1:
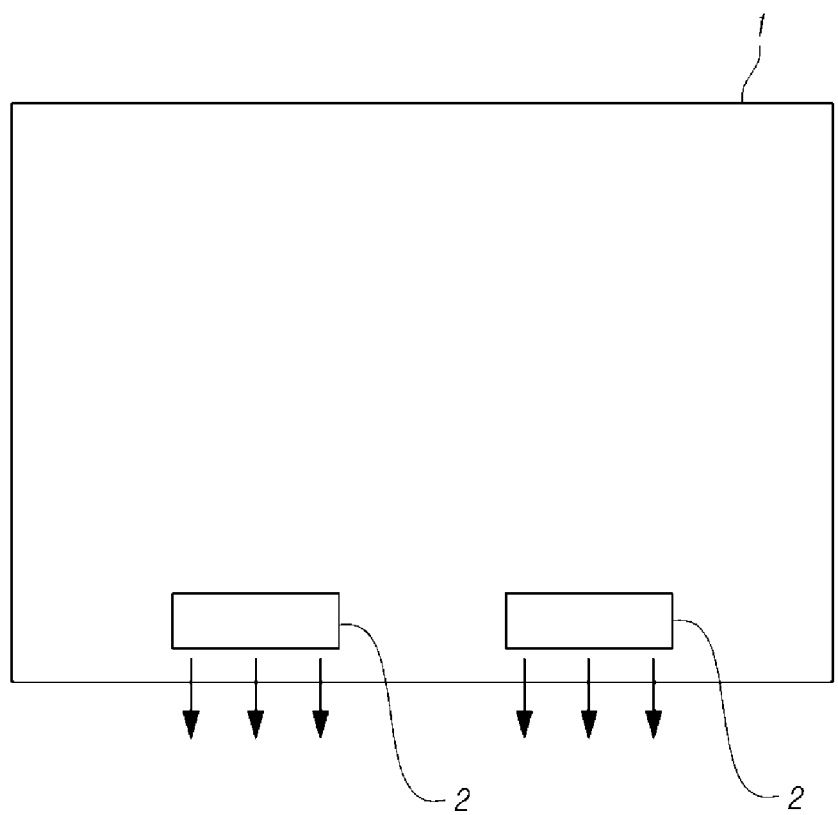
FIG. 1 is a plan view of a speaker included in a related art display device.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to some embodiments of the present disclosure, examples of which are illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

The term "display device" used in the specification refers not only to a display device, such as a display panel (or display module), a liquid crystal module (LCM), and an organic light-emitting diode (OLED) module including a driving unit for driving the display panel, but also to a set electronic device or a set device, such as a notebook computer, a television, a computer monitor, equipment display (e.g., display equipment in an automotive display or other type of vehicle display), or to a mobile electronic device, such as a smart phone or an electronic pad, etc., which is a finished product that may include an LCM, an OLED module, and the like. That is, in the present specification, the term "display device" is used as a display device such as the LCM and OLED module and a so-called "set device," which is an application product or final consumer device including a display device implemented therein.

However, in some cases, a "display device" of an LCM and an OLED module including a display panel and a driving unit thereof are distinguished from a "set device" or a "set apparatus." For example, the meaning of a "display device" may include a liquid crystal display panel (LCD) or an organic light-emitting diode (OLED) display panel and a source printed circuit board (PCB) as a controller for driving the same, and the set device or the set apparatus may further include a set PCB, as a set controller, which is electrically connected to the source PCB to control the entire set device or the entire set apparatus.

The display panel used in an embodiment of the present disclosure may include any type of display panel, such as a liquid crystal display (LCD) panel, an organic light-emitting diode (OLED) display panel, etc., and is not limited to a specific display panel technology capable of generating sound waves or audible outputs due to vibrations created by being directly vibrated by the sound-generating actuator.

When the display panel is a liquid crystal display panel, the display panel may include a pixel defined by a plurality of gate lines, a plurality of data lines, and an intersecting area thereof, an array substrate including a thin-film transistor corresponding to a switching element for adjusting a light transmission degree at each pixel, an upper substrate including a color filter and/or a black matrix, etc., and a liquid crystal material layer formed therebetween.

Also, when the display panel is an organic light-emitting diode (OLED) display panel, the display panel may be configured by including a pixel defined in a plurality of gate lines, a plurality of data lines and an intersecting area thereof, and an array substrate including thin film transistors, which are elements for selectively applying a voltage to each pixel, an organic light-emitting diode (OLED) layer on the array substrate, and an encapsulation substrate disposed on the array substrate to cover the organic light-emitting diode layer, and the like. The encapsulation substrate may protect the thin film transistors, the organic light-emitting diode layer, and the like from external impact, and may prevent moisture and/or oxygen from penetrating into the organic light-emitting diode layer. The layer on the array substrate may include an inorganic light-emitting layer, for example, quantum dot emitting layer layer(s), nano-sized material layer(s), etc. that may enhance output image quality. The display panel used in the display device according to the described embodiments of the present disclosure is not limited in its shape, size, type, etc.

With any display type, the display panel may further include a backing, such as a metal plate attached thereto. Other structures may also be included. The display panel having the actuators in the specification may be implemented at a user interface module in a vehicle, such as at the central control panel area in an automobile. For example, such display panel can be configured between two front seat occupants such that sounds due to vibrations of the display panel propagate towards the interior of the vehicle. As such, the audio experience within a vehicle can be improved when compared to having speakers only at the interior sides in the vehicle.

In the case of a liquid crystal display panel, because an indirect light source-type backlight, in which a plurality of layers are stacked and a separate light source is disposed, should be provided. On the other hand, because an organic light-emitting element of an OLED display panel corresponds to a self-light-emitting element, and thus does not require a separate light source, and because several layers, such as a polarizing layer (POL), a glass layer, and an encapsulation layer are laminated into one panel, even if the organic light-emitting element is directly vibrated by the sound-generating actuator, there is almost no influence on the light-emitting characteristics of the organic light-emitting layer, so that image distortion does not occur. However, it is not necessary to use a self-emitting display panel, such as the organic light-emitting diode display panel or the inorganic light-emitting display panel. Meanwhile, because the display panel used in the display device according to an embodiment of the present disclosure has a generic structure, a detailed description of the display panel will be omitted.

Figure 2A:
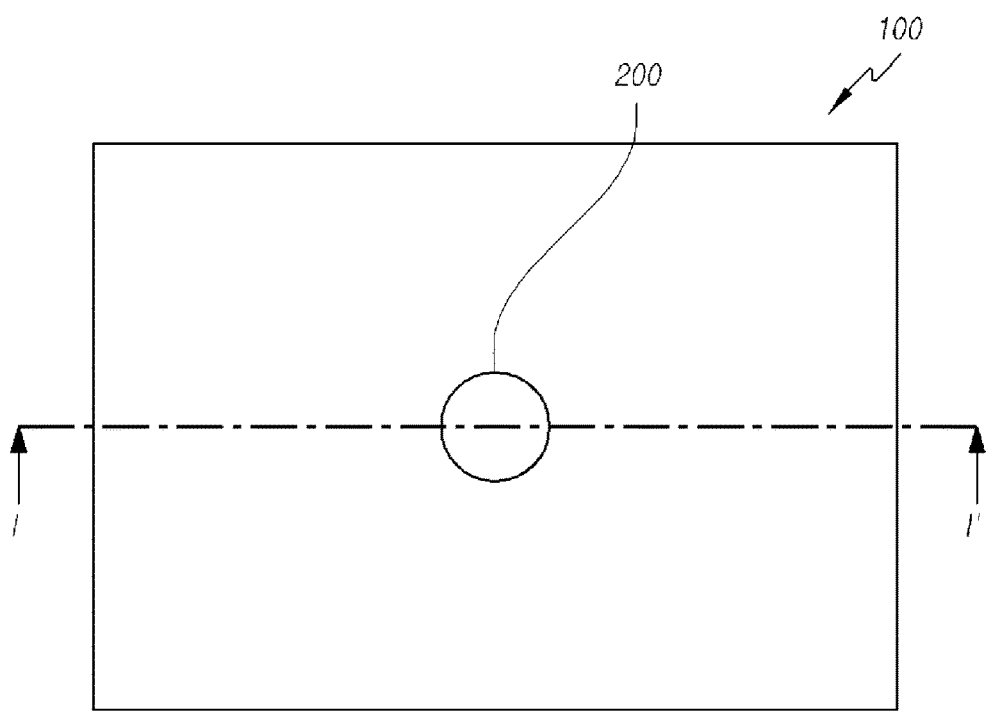
FIGS. 2A and 2B are views of a display device including a panel vibration type sound-generating device to which an embodiment is applicable.
Figure 2B:
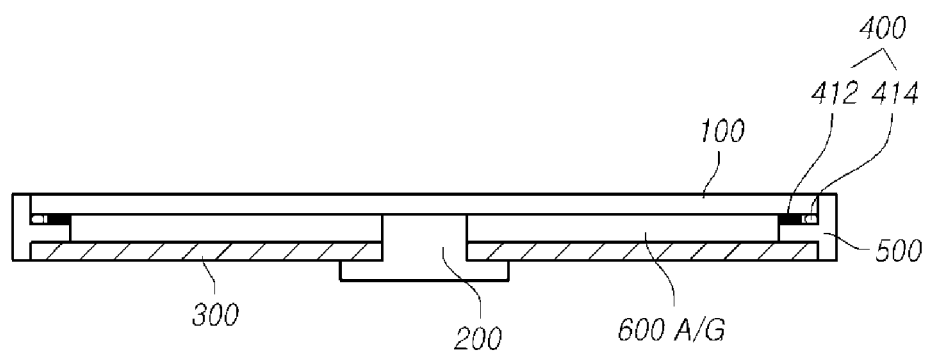

FIGS. 2A and 2B are views of a display device including a panel vibration type sound-generating device to which an embodiment is applicable. FIG. 2A is a plan view. FIG. 2B is a cross-sectional view of FIG. 2A taken along line I-I'.

As illustrated in FIG. 2, the display device, to which an embodiment is applicable, may include a display panel 100 configured to display an image and a sound-generating actuator 200 configured to contact with one surface of the display panel and vibrate the display panel, thereby generating sound.

As described in more detail below, e.g., with reference to the examples of FIGS. 4A and 4B, the sound-generating actuator 200 may include a magnet, a plate for supporting the magnet, a center pole protruding from a central area of the plate, and a bobbin surrounding the periphery of the center pole and wound with a coil to which a current for generating sound may be applied. A tip end of the bobbin may contact one surface of the display panel.

Further, as illustrated in the FIG. 2B example, the display device may include a support structure that supports at least one of a rear surface and a side surface of the display panel, and the lower plate of the sound-generating actuator or the like may be fixed to the support structure. The support structure may include the cover bottom 300 disposed on the rear surface of the display panel 100. The support structure may further include a middle cabinet 500 coupled to the cover bottom 300 while enclosing the side surface of the display panel 100 and accommodating and supporting one side edge of the display panel 100. The support structure may be a cover bottom, e.g., cover bottom 300, and other structures may be included. The support structure, which may be a cover bottom, may include additional parts, may include multiple parts, and need not cover the entire rear of the display panel. The support structure may include other elements (much as an actual product) to directly or indirectly support the actuators.

The cover bottom 300 constituting the support structure may be a plate-shaped member formed of a metal or plastic that extends over the entire rear surface of the display device. The cover bottom 300 used herein is not limited by the term "cover bottom," but may be referred to as other terms, e.g., a plate bottom, a back cover, a base frame, a metal frame, a metal chassis, a chassis base, and an m-chassis. The term "cover bottom" shall be understood as a concept including any type of a frame or a plate-shaped structure disposed on the rear base of the display device for supporting the display panel. The support structure may be a cover bottom, e.g., cover bottom 300, and other structures may be included. The support structure, which may be a cover bottom, may include additional parts, may include multiple parts, and need not cover the entire rear of the display panel. The support structure may include other elements (much as an actual product) to directly or indirectly support the actuators Also, the display device according to an embodiment may further include a baffle portion 400 disposed between the cover bottom 300 as a support structure or the middle cabinet 500 and the display panel 100 to form an air gap space 600 (A/G), which is a space for transmitting a generated sound wave. That is, by hermetically coupling the display panel 100 to the cover bottom 300 at the edge of the air gap space 600 (A/G), the air gap space 600 may be defined as an area sealed in four sides, and such a sealed air gap space may be referred to as a "baffle" structure.

The baffle portion 400 may include one or both of: an adhesive member 412, which may be at an edge of the cover bottom 300 or the middle cabinet 500 to be bonded to the lower surface of the display panel; and a sealing portion 414 outside the adhesive portion 412 to further provide a sealing property of the air gap space 600 (A/G). In one example, the adhesive portion 412 may be a double-sided tape. As described in more detail below with reference to FIGS. 12A to 12C, the height of the sealing portion 414 may be larger than the height of the adhesive portion 412.

Figure 3A:
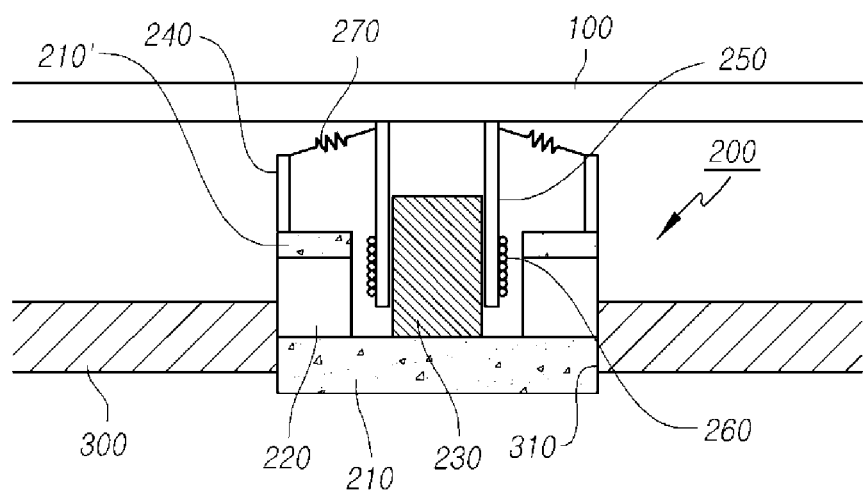
FIGS. 3A and 3B are cross-sectional views of two types of sound-generating actuators, each of which may be used for an embodiment.
Figure 3B:
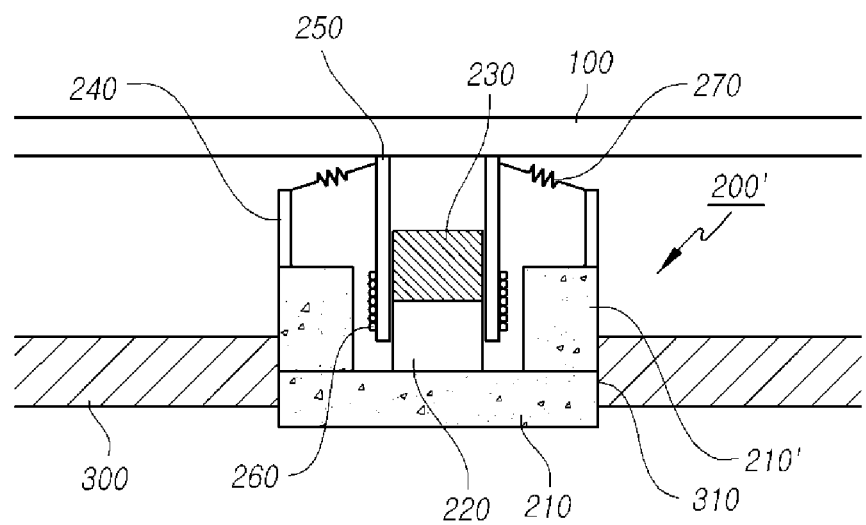

FIGS. 3A and 3B are cross-sectional views of two types of sound-generating actuators, each of which may be used for an embodiment.

The sound-generating actuator 200 used in an embodiment may include a magnet 220 as a permanent magnet, plates 210 and 210' configured to support the magnet 200, a center pole 230 protruding from a central area of the plate 210, a bobbin 250 surrounding the center pole 230, and a coil 260 wound around the outer periphery of the bobbin 250 and applied with a current for generating sound. The sound-generating actuator 200 used in an embodiment may have, e.g., either a first type of structure in which the magnet is disposed outside the coil or a second type of structure in which the magnet is disposed inside the coil.

FIG. 3A illustrates the first type of structure in which the magnet is disposed outside the coil. The first type of structure may be referred to as a "dynamic" type or an "external" magnet type. In a sound-generating actuator according to the first type of structure, the lower plate 210 may be fixed to a support hole 310 formed in the cover bottom 300. The magnet 220, which may be an annular permanent magnet, may be disposed around the outer portion of the lower plate 210.

An upper plate 210' may be disposed above the magnet 220. An outer frame 240 formed to protrude from the upper plate 210' may be disposed on the outer periphery of the upper plate 210'.

The center pole 230 may protrude from the central area of the lower plate 210. The bobbin 250 may surround the center pole 230. The coil 260 may be wound around the lower portion of the bobbin 250, and a current for generating sound may be applied to the coil 260. A damper 270 may be disposed between a part of the upper portion of the bobbin 250 and the outer frame 240.

The lower plate 210 and the upper plate 210' may be configured to fix the sound-generating actuator 200 to the cover bottom 300, while supporting the magnet 220. As illustrated in the FIG. 3A example, the lower plate 210 may be provided in a circular shape, the ring-shaped magnet 220 may be on the lower plate 210, and the upper plate 210' may be on the magnet 220.

Also, as the lower plate 210 and the upper plate 210' may be coupled to the cover bottom 300, the magnet 220 positioned between the lower plate 210 and the upper plate 210' may be fixedly supported. The plates 210 and 210' may be formed of a magnetic material, such as iron (Fe). The plates 210 and 210' are not limited by the term "plate," but may be expressed by other terms, such as a "yoke." The center pole 230 and the lower plate 210 may be integrally formed.

The bobbin 250 may be an annular structure formed of, e.g., paper, an aluminum sheet, or the like. The coil 260 may be wound around a particular area of the lower portion of the bobbin 250. The bobbin 250 and the coil 260 may be collectively referred to as a "voice" coil.

When a current is applied to the coil 260, a magnetic field is formed around the coil 260. Because there is an external magnetic field formed by the magnet 220, the entire bobbin 250 moves upward while being guided by the center pole 230 according to Fleming's right-hand rule. Because the tip end portion of the bobbin 250 may be in contact with the rear surface of the display panel 100, the display panel 100 may be vibrated according to the current application or non-application state, and a sound wave may be generated due to the vibration. As the magnet 220, e.g., a sintered magnet, such as barium ferrite or the like, may be used, and as the material thereof, an alloy casting magnet of ferric oxide ($Fe_2O_3$), barium carbonate ($BaCO_3$), strontium ferrite with an improved magnetic component, aluminum (Al), nickel (Ni), and cobalt (Co), or the like may be used, but materials are not limited thereto.

Meanwhile, the damper 270 may be disposed between a portion of the upper portion of the bobbin 250 and the outer frame 240. The damper 270 may be provided in a corrugated structure to shrink and relax in accordance with the vertical movements of the bobbin 250 to adjust the vertical (up and down) vibration of the bobbin 250. That is, because the damper 270 may be connected to each of the bobbin 250 and the outer frame 240, the vertical vibration of the bobbin 250 may be limited by the restoring force of the damper 270. When the bobbin 250 is vibrated to an upwardly particular height or higher or to a downwardly particular height or lower, the bobbin 250 can be returned to its original position due to the restoring force of the damper 270. Such a damper 270 may be expressed by other terms, such as an "edge."

FIG. 3B illustrates the second type of structure in which the magnet is disposed inside the coil. The second type of structure may be referred to as a "micro" type or an "internal" magnet type.

In a sound-generating actuator according to the second type of structure, the lower plate 210 may be fixed to the support hole 310 formed in the cover bottom 300. The magnet 220 may be disposed in the central area of the lower plate 210. A center pole 230 may be formed to extend to the upper portion of the magnet 220. An upper plate 210' may protrude from the outer periphery of the lower plate 210. The outer frame 240 may be disposed outside the upper plate 210'.

A bobbin 250 may surround the periphery of the magnet 220 and the center pole 230. A coil 260 may be wound around the outer periphery of the bobbin 250. Also, a damper 270 may be disposed between the outer frame 240 and the bobbin 250.

The second type of sound-generating actuator is characterized in that fewer leakage magnetic fluxes may be generated, and the overall size may be made smaller as compared to the first type of sound-generating actuator in which the magnet is disposed at the outside. However, a magnetic flux reduction phenomenon may be caused by a large current input in the second type of sound-generating actuator. Also, the second type of sound-generating actuator may be more difficult to fabricate.

In an embodiment, both of the first type of sound-generating actuator and the second type of sound-generating actuator can be used. For the convenience of description, the first type sound-generating actuator will be described in the examples below.

Also, a sound-generating actuator used in the display device according to an embodiment is not limited to the types illustrated in FIGS. 3A and 3B. A sound-generating actuator of any other type may be used, as long as the sound-generating actuator can vibrate the display panel according to the application of a current to generate sound. The vibration may be, for example, in an up and down direction.

Figure 4A:
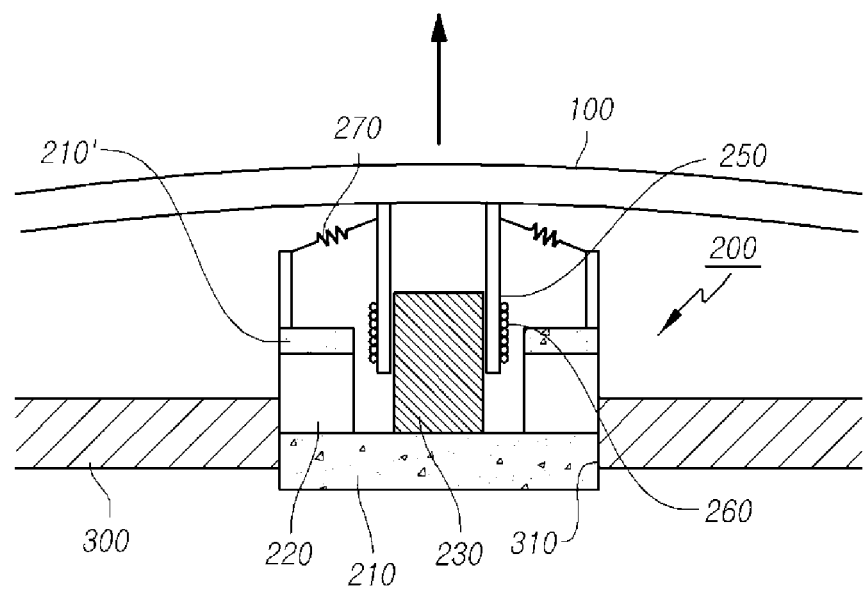
FIGS. 4A and 4B illustrate states in which the sound-generating actuator, which may be used for an embodiment, vibrates the display panel to generate sound.
Figure 4B:
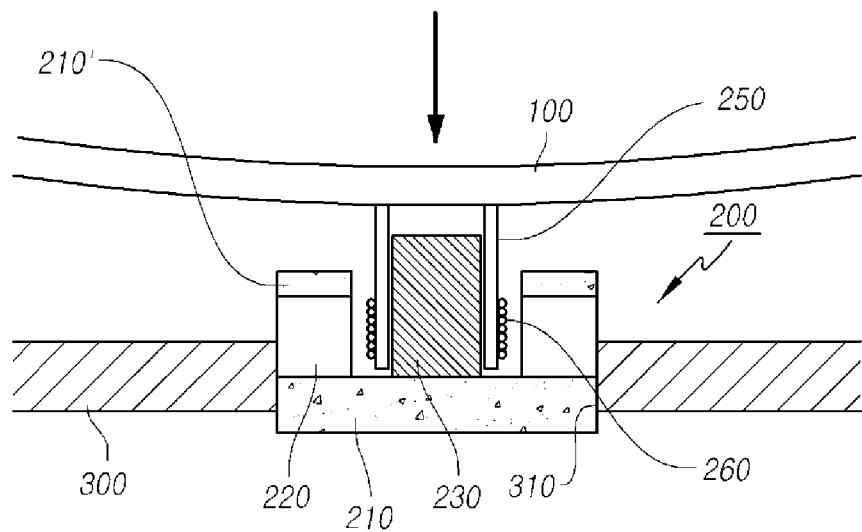

FIGS. 4A and 4B illustrate states in which the sound-generating actuator, which may be used for an embodiment, vibrates the display panel to generate sound.

With reference to FIG. 4A, in a state in which a current is applied, the center pole 230 connected to the lower surface of the magnet 220 may become an N pole, and the upper plate 210' connected to the upper surface of the magnet 220 may become an S pole so that an external magnetic field may be formed between the center pole 230 and the upper plate 210'. In this state, when a current for generating sound is applied to the coil 260, an applied magnetic field is generated around the coil 260, and a force for moving the bobbin 250 upward is generated due to the applied magnetic field and the external magnetic field.

Accordingly, as illustrated in the FIG. 4A example, the bobbin 250 may move upward, and the display panel 100, which is in contact with the tip end of the bobbin 250, vibrates upward (see the arrow direction of FIG. 4A). When the application of the current is stopped or a current in the opposite direction is applied, a force for moving the bobbin 250 downward is generated according to a similar principle as illustrated in the FIG. 4B example. As a result, the display panel 100 vibrates downward (see the arrow direction of FIG. 4B). In this manner, the display panel may vibrate upward and downward according to the current application direction to the coil and the magnitude of the current, and a sound wave may be generated by the vibration.

Figure 5A:
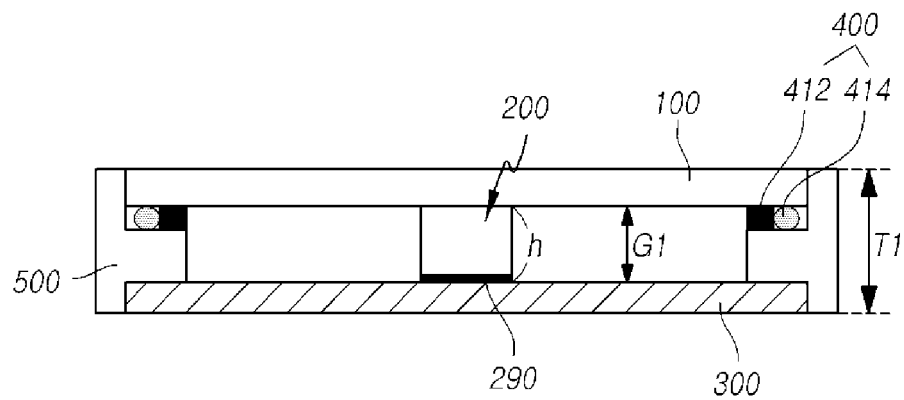
FIGS. 5A and 5B are views of various forms of coupling a sound-generating actuator to a cover bottom, which may be a support structure of the display device.
Figure 5B:
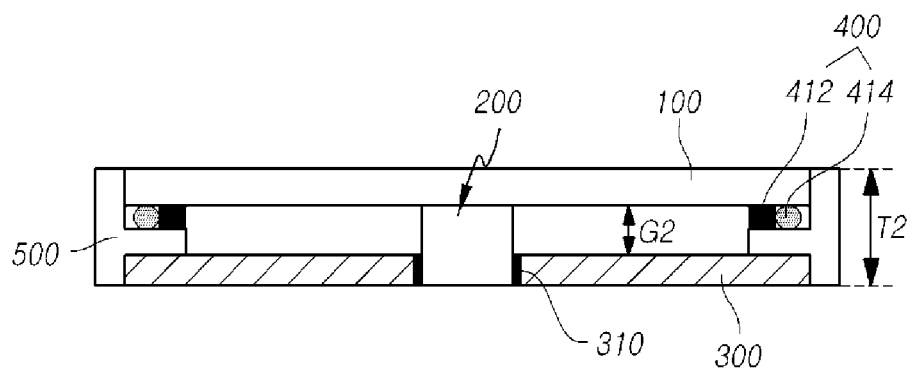

FIGS. 5A and 5B are various forms of coupling a sound-generating actuator to a cover bottom, which may be a support structure of the display device.

The display device to which an embodiment is applied uses a principle in which the sound-generating actuator 200 directly vibrates the display panel, and as a result, generates sound. Therefore, because the sound-generating actuator should vibrate the display panel bonded thereto by moving a bobbin or a voice coil, the body of the sound-generating actuator should be fixed to the cover bottom, which is a rear support structure of the display device.

FIGS. 5A and 5B illustrate various methods of fixing the sound-generating actuator to the cover bottom. FIG. 5A illustrates a method of directly attaching the sound-generating actuator to the inner surface of the cover bottom. FIG. 5B illustrates a method of forming a support hole in the cover bottom and fixedly inserting the sound-generating actuator into the support hole.

FIG. 5A illustrates a method of fixedly bonding the rear surface of the sound-generating actuator 200 to the inner surface of the cover bottom 300 with an adhesive member 290 without changing the structure of the cover bottom 300. Meanwhile, FIG. 5B illustrates a method of forming a support hole 310 in the cover bottom 300 and fixedly inserting a portion of the side surface of the sound-generating actuator 200 into the support hole 310.

In both of the examples of FIGS. 5A and 5B, in the edge area of the display device, the baffle portion 400 may be provided between the upper surface of the middle cabinet 500 or the cover bottom 300 and the display panel 100 to form an air gap space as a sealing area. In the example of FIG. 5A, the distance of the air gap space, which is the space between the display panel 100 and the cover bottom 300, becomes G1, which is relatively large, and is equal to or greater than the height "h" of the sound-generating actuator 200. In the example of FIG. 5B, because a portion of the sound-generating actuator 200 is inserted into the support hole 310 of the cover bottom 300, the distance of the air gap space between the display panel 100 and the cover bottom 300 becomes G2, which is smaller than the height of the sound-generating actuator 200.

Therefore, the example of FIG. 5B can make the thickness of the display device smaller than the example of FIG. 5A, e.g., T1>T2, and thus may be more suitable for the recent thinning trend of reducing the thickness of the display device. Therefore, embodiments of the present invention include a support hole formed in the cover bottom, which may be a rear support structure of the display panel, and the sound-generating actuator may be fixedly inserted into the support hole, as illustrated in FIG. 5B.

Meanwhile, in examples having the support hole in the cover bottom of the display device and fixedly inserting the sound-generating actuator into the support hole as described above, the diameter of the support hole may be larger than the diameter of the sound-generating actuator, which may cause a sound leakage phenomenon through a gap between the sound-generating actuator and the cover bottom. This will be described in detail below with reference to FIGS. 6A to 8.

Figure 6A:
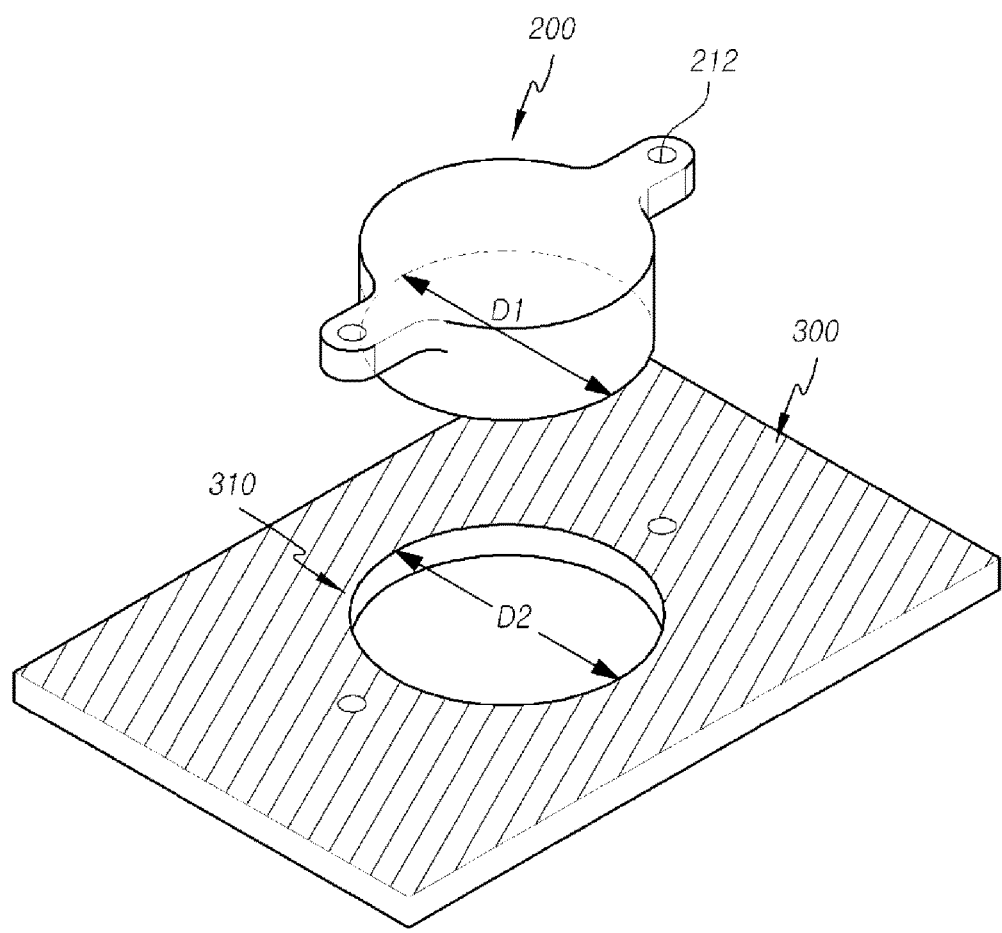
FIG. 6A is a perspective view of a sound-generating actuator having extensions formed to fix the sound-generating actuator to a cover bottom.
Figure 6B:
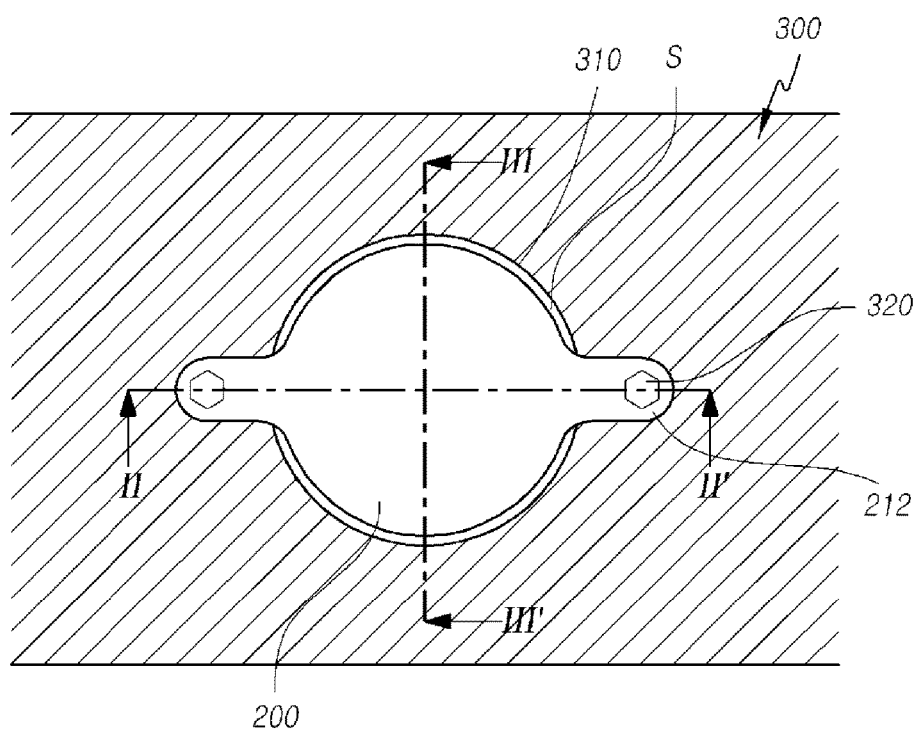
FIG. 6B is a rear view illustrating a state in which the sound-generating actuator is fixedly inserted into the support hole formed in the cover bottom which is a display device support structure.
Figure 7A:
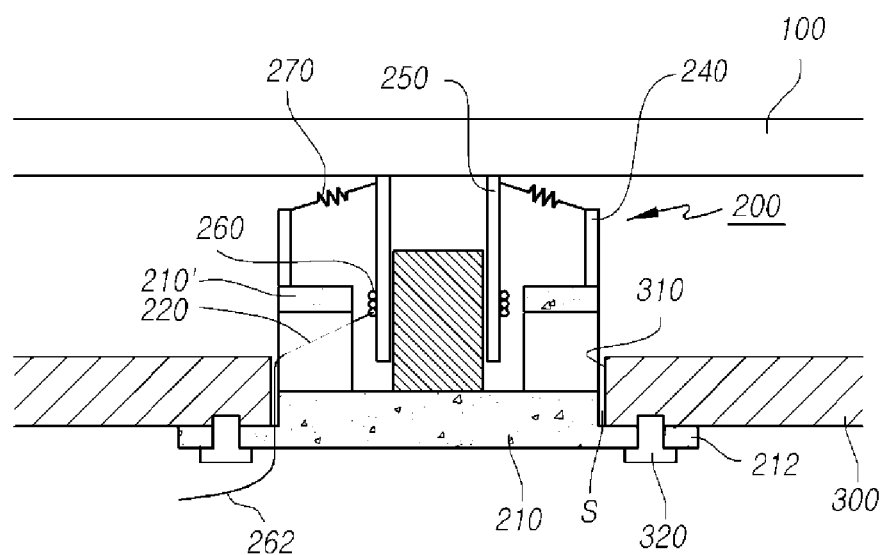
FIGS. 7A and 7B are cross-sectional views respectively taken along line II-II' and line III-III' in FIG. 6B, in which a gap S between a side surface of the sound-generating actuator and the support hole in the cover bottom and a sound leakage phenomenon through the gap S are illustrated.
Figure 7B:
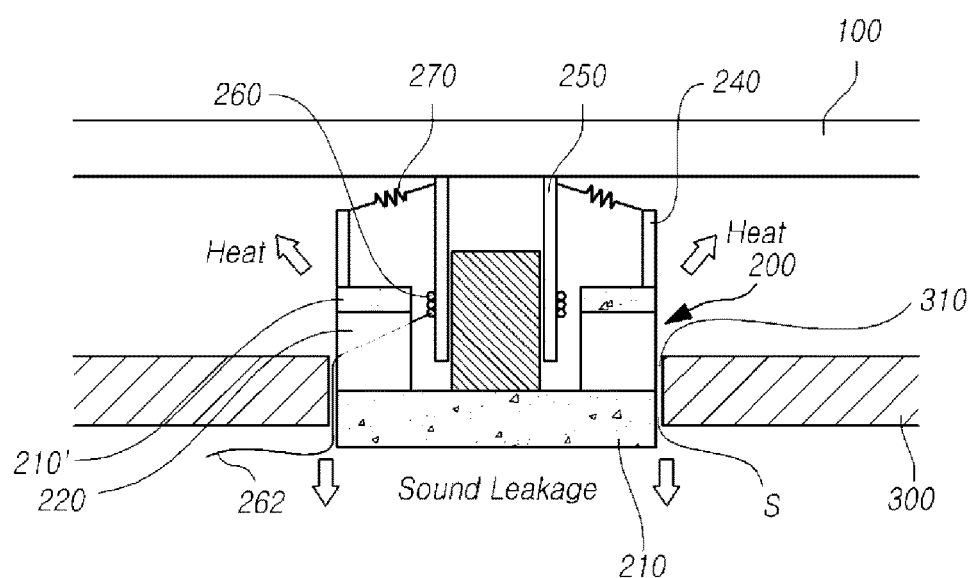

FIG. 6A is a perspective view of a sound-generating actuator having extensions formed to fix the sound-generating actuator to a cover bottom. FIG. 6B is a rear view illustrating a state in which the sound-generating actuator is fixedly inserted into the support hole formed in the cover bottom, which is a display device support structure. FIGS. 7A and 7B are cross-sectional views respectively taken along line II-II' and line III-III' of FIG. 6B, in which a gap S between a side surface of the sound-generating actuator and the support hole in the cover bottom and a sound leakage phenomenon through the gap S.

As illustrated in the examples of FIGS. 6A and 6B, a support hole 310 may be formed through the cover bottom 300. At least one of the lower plate 210, the magnet 220, and the upper plate 210' of the sound-generating actuator 200 may be inserted into and accommodated in the support hole 310. Extension portions 212 may be further formed on the lower surface of the lower plate 210 of the sound-generating actuator 200 to extend to the outside of the lower plate 210. The extension portions 212 may be fixed to the lower surface of the cover bottom 300 to mount the sound-generating actuator 200 on the cover bottom.

That is, in fixing the sound-generating actuator 200 to the cover bottom 300 as illustrated in the FIG. 6B example, screw holes may be formed in the rear surface of the cover bottom 300, and bolts 320 or screws may be fastened through the through holes formed in the extension portions 212 of the lower plate 210, thereby fixing the sound-generating actuator 200 to the cover bottom 300. Because the sound-generating actuator 200 should be inserted into the support hole 310 of the cover bottom 300, the diameter D2 of the support hole 310 should be larger than the diameter D1 of the sound-generating actuator 200, as shown in the FIG. 6A example.

The sound-generating actuator 200 should vibrate strongly, e.g., at a frequency of several tens of kHz or more. In this process, however, the sound-generating actuator 200 may hit the inside of the support hole 310, and unnecessary noise may be generated. Also, to connect the coil 260 wound around the bobbin of the sound-generating actuator 200 to an external sound-generating control unit, a space allows a connection wiring (see reference 262 in FIG. 7) to be introduced from the outside.

Therefore, the diameter D2 of the support hole 310 of the cover bottom 300 should be larger than the diameter D1 of the sound-generating actuator 200 by a particular size. Therefore, as illustrated in the examples of FIGS. 6B and 7B, a gap S exists between the side surface of the sound-generating actuator 200 and the support hole 310 of the cover bottom 300. That is, as illustrated in the FIG. 7A example, because the extension portions 212 of the lower plate 210 may be formed to only extend left-to-right or up-and-down, the gap S between the sound-generating actuator 200 and the support hole 310 of the cover bottom 300 may be formed in all directions in which the extension portions 212 is not formed.

As described above, the improved sealing property of the air gap space A/G provides improved sound generation and transmission characteristics by vibration of the display panel. However, the sealing property of the air gap space A/G may be deteriorated by the gap S between the side surface of the sound-generating actuator and the support hole of the cover bottom.

That is, as illustrated in the FIG. 7B example, the sound generated in the air-gap space may partially leak through the gap S between the side surface of the sound-generating actuator 200 and the support hole 310 of the cover bottom 300. According to the sound leakage as described above, the sound pressure inside the air gap space may be reduced so that the sound output may be reduced. Further, the sound quality may be deteriorated due to interference caused by reflected sound generated by leaked sound.

Figure 8:
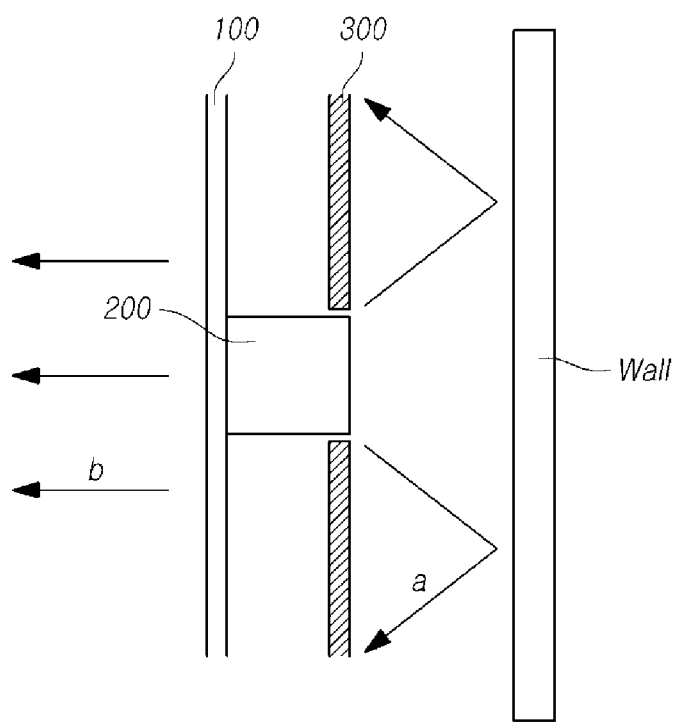
FIG. 8 is a view illustrating reflected sound occurring from the leakage sound in FIG. 7B that is reflected from a rear wall and directed forward, and a sound characteristic deterioration phenomenon caused thereby.

FIG. 8 is a view illustrating reflected sound occurring from the leakage sound in FIG. 7B that is reflected from a rear wall and directed forward, and a sound characteristic deterioration phenomenon caused thereby.

As illustrated in the FIG. 8 example, the sound leaked through the gap S between the side surface of the sound-generating actuator and the support hole of the cover bottom may be reflected from the rear wall on which the display device (a TV or the like) to be directed toward the front viewer. The sound may be referred to as "reflected sound 'a'." The reflected sound "a" may have a phase that is different from that of the originally generated normal sound "b", or the reflected sound "a" may interfere with the normal sound "b", thereby causing the overall sound output characteristic to deteriorate.

The method of fixedly inserting the sound-generating actuator 200 into the support hole formed in the cover bottom 300 is advantageous to reduce the thickness of the display device. In this case, however, there is a problem in that the sound output characteristic may be deteriorated due to the gap S between the side surface of the sound-generating actuator and the support hole of the cover bottom.

Therefore, in an embodiment described below with reference to the examples of FIGS. 9A and 9B, an outer peripheral portion having a larger diameter may be formed in the rear portion of the sound-generating actuator, and a sealing member for reducing the leakage of the reflected sound may be formed between the inner surface of the outer peripheral portion of the sound-generating actuator and the outer surface (rear surface) of the cover bottom, thereby providing a structure that remedies the disadvantage described above.

Figure 9A:
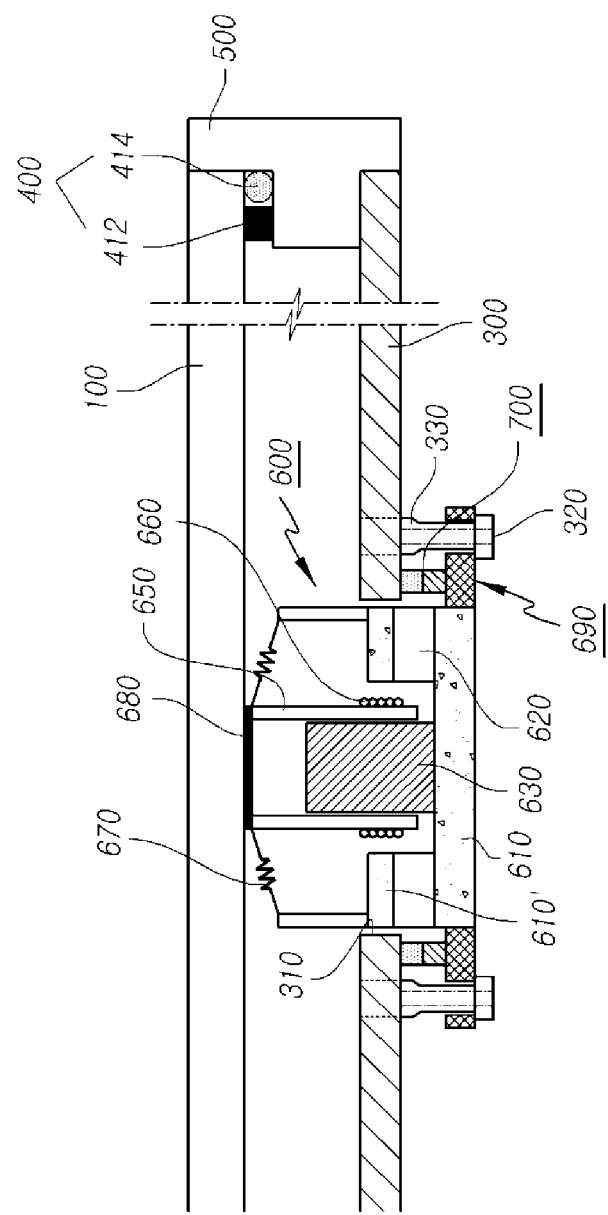
FIG. 9A is a cross-sectional view of a display device including a sound-generating actuator and a sealing member according to an embodiment of the present disclosure.

FIG. 9A is a cross-sectional view of a display device including a sound-generating actuator and a sealing member according to an embodiment of the present disclosure. FIG. 9B is a perspective view of a sound-generating actuator having an outer peripheral portion formed using a mold cover.

The panel vibration type sound-generating display device according to an embodiment of the present disclosure may include a display panel 100 for displaying an image, a cover bottom 300 as a support structure for covering and supporting at least the rear surface of the display panel 100, a sound-generating actuator 600 inserted into the support hole 310 provided in the cover bottom 300 and disposed such that a tip end thereof is in contact with one surface of the display panel 100 to vibrate the display panel, thereby generating sound, and a sealing member 700 disposed between the outer peripheral portion of the sound-generating actuator 600 and the outer surface of the cover bottom 300.

Figure 9B:
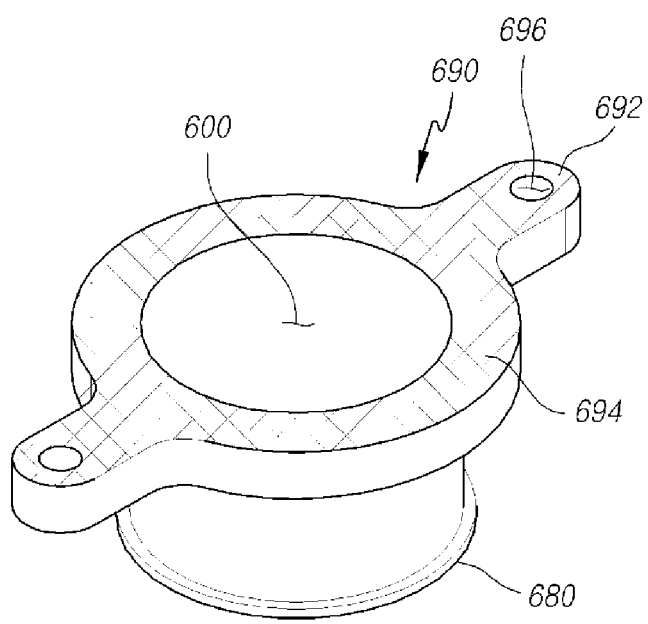
FIG. 9B is a perspective view of a sound-generating actuator having an outer peripheral portion formed using a mold cover.

The display panel 100, the cover bottom 300, and the support holes 310 formed in the cover bottom 300 in the examples of FIGS. 9A and 9B are the same as those of the structures described above with reference to the examples of FIG. 2A to FIG. 8. Thus, the detailed description thereof will be omitted.

The sound-generating actuator 600 may include a lower plate 610 inserted into the support hole 310, a magnet 620 on the lower plate 610, a center pole 630 in the center of the lower plate 610, and a bobbin 650 surrounding the periphery of the center pole 630 and having a tip end in contact with the display panel 100, and a coil 660 wound around the outer periphery of the bobbin 650. In this case, the bobbin 650 and the coil 660 may be referred to as a "voice" coil. However, such detailed structure is merely an example, as various other equivalent components can be used to implement the actuators used for the embodiments of the present disclosure.

Also, the sound-generating actuator 600 used in the examples of FIGS. 9A and 9B is not limited to the external magnet type illustrated in FIGS. 9A and 9B, but may also be applied to the internal magnet type or micro type in which the magnet is disposed at the center of the actuator, as described above, e.g., with reference to the FIG. 3B example. The more detailed construction and operation principles of the sound-generating actuator 600 correspond to those described above with reference to FIGS. 3A and 3B and FIGS. 4A and 4B. Thus, the detailed description thereof will be omitted to avoid a redundant description.

An adhesive member 680 for bonding the bobbin 650 to the display panel 100 may be disposed at the tip end of the bobbin 650. The adhesive member 680 may be configured, for example, with a double-sided tape or the like.

Also, in addition to the adhesive member 680, at least one plate may be disposed on the tip end of the bobbin 650. The plate may be integrally formed with the adhesive member 680. A vibration transmitting plate may transmit a vibration force to the display panel 100 according to the movement of the bobbin 650. The vibration transmitting plate may be formed, e.g., of a plastic material, a metal, or the like. In one example, the vibration transmitting plate may be made of the metal material to dissipate heat generated from the bobbin 650 and the sound-generating actuator 600. A damper 670 may be disposed between a part of the upper portion of the bobbin 650 and the adhesive member 680.

The rear portion of the sound-generating actuator 600 may further include an outer peripheral portion that is defined as an area expanded more than the diameter of the lower plate 610. The outer peripheral portion of the sound-generating actuator 600 may be configured as an expansion portion that is integrally formed to extend from the lower plate, or may be a separate mold cover 690, e.g., injection-molded through insert molding or the like, to surround the side surface of the lower plate. In the examples of FIGS. 9A and 9B, a separate mold cover 690, which may be injection-molded to surround a side structure of the actuator 600, such as the lower plate 610, is used as the outer peripheral portion of the sound-generating actuator 600.

As illustrated in the FIG. 9B example, the mold cover 690 may be formed to surround at least a side surface of the lower plate 610 or a yoke which may be the rearmost structure of the sound-generating actuator 600. The mold cover 690 may be manufactured by inserting the lower plate 610 or the yoke into a particular mold, and then pouring plastic or resin into the mold to perform injection molding.

In one example, the mold cover 690 may be fabricated to cover the side surface of the lower plate 610 and the magnet 620, or the like. The mold cover 690 may cover the rear surface of the lower plate 610 in some cases. The mold cover 690 is not limited by the term "mold cover," as long as it is a structure surrounding a portion of the actuator as described above, and may be expressed by other terms, such as an actuator support, a mold plate, or a mold structure.

The mold cover 690 may be formed of a material, such as plastic, and may include a expansion portion 694 expanded radially from side surface of the lower plate 610 of the sound-generating actuator 600, and extension portions 692 integrally extending from both sides of the expansion portion 694. A through hole 696 may be formed in each of the extension portions 692 to allow a fixing bolt 320 to pass therethrough.

That is, in the examples of FIGS. 9A and 9B, the mold cover 690 may form the outer peripheral portion of the sound-generating actuator 600. For example, the sealing member 700 may be disposed between the inner surface of the expansion portion 694 of the mold cover 690 and the rear surface of the cover bottom 300. The mold cover 690 may be coupled to the cover bottom 300 by the fixing bolts 320 passing through the through holes 696 formed in the extension portions 692 of the mold cover 690.

The method of fixing the sound-generating actuator 600 including the mold cover 690 according to the examples of FIGS. 9A and 9B will be described in more detail below. First, one end of a self-clinching nut 330, e.g., a PEM® nut, may be press-fitted into the self-clinching nut fixing hole formed in the cover bottom 300. Then, the tip end portion of the self-clinching nut 330 may be coated to be fixed to the cover bottom 300.

Because a through hole 696 may also be formed in the extension portions 692 of the mold cover 690 of the actuator 600, the through hole may be aligned with the screw hole of the self-clinching nut 330. Then, the fixing bolt 320 may be tightened so that the sound-generating actuator 600 is fixedly coupled to the cover bottom 300.

The PEM® nut 330 is one type of a "self-clinching" nut. When a self-clinching nut 330, such as a PEM® nut, is used, there is an advantage in that the length of the fixing bolt 320 can be reduced. Further, there is an advantage in that it is possible to solve a problem in which the fixing force is not enough when the fixing bolt 320 is directly screwed to the cover bottom 300 because the cover bottom is thin.

That is, in the absence of the self-clinching nut 330, it may be necessary to directly screw the fixing bolt 320, which has passed through the through-hole of the mold cover 690, which is the outer peripheral portion of the sound-generating actuator 600, to the screw hole formed in the cover bottom 300. In this case, there is no problem in the coupling when the thickness of the cover bottom is large. However, when the cover bottom is relatively thin, there is a problem in that the coupling force is not sufficient. Therefore, when the self-clinching nut 330 is fixed to the cover bottom 300 through the press-fit/caulking method as described above, and then the outer peripheral portion of the actuator 600 is screwed to the self-clinching nut 330, a sufficient coupling force can be ensured, even if the cover bottom is relatively thin.

Meanwhile, in the examples of FIGS. 9A and 9B, the sealing member 700 may be disposed between the inner surface of the mold cover 690 constituting the outer peripheral portion of the sound-generating actuator 600, e.g., between the expansion portion 694 of the mold cover 690 and the surface of the cover bottom 300.

The sealing member 700 may be a sealing member in the form of an annular O-ring. One side of the sealing member 700 may contact or may be attached to the outer peripheral portion of the sound-generating actuator 600 (i.e., the inner surface of the expansion portion 694 of the mold cover 690 in the embodiment of FIGS. 9A and 9B), and the other side may contact the outer surface of the cover bottom 300, thereby sealing the actuator space inside the sealing member 700. Accordingly, as described with reference to FIGS. 6A to 8, it is possible to reduce the sound leakage through the gap S between the sound-generating actuator and the support hole of the cover bottom, and the generation of the reflected sound caused thereby.

For this purpose, the selection of the material of the sealing member 700 becomes important. When the sealing member 700 is formed of only a soft material having a low elastic modulus, the sealing member 700 may be deformed by the sound pressure of the sound leaking out through the gap S between the sound-generating actuator and the support hole of the cover bottom. As a result, there is a possibility that some of the sound leaks out.

That is, when the sealing member 700 is formed of only a single soft material and when the sound pressure of the generated sound is increased, the sealing member may be deformed, and sound may leak out through the gap between the sealing member and the surface of the cover bottom. As a result, abnormal sound, such as a whistling noise and trembling sound, may be generated.

On the contrary, when a hard material having a high elastic modulus is used as the material of the sealing member 700, deformation due to the above-mentioned sound pressure, and thus sound leakage, can be reduced. However, when the sound-generating actuator vibrates to generate sound, an intermittent contact may be performed between the tip end of the sealing member 700 and the rear surface of the cover bottom 300. Because both the members are formed of a solid material, a noise due to such a contact may be generated.

Figure 10A:
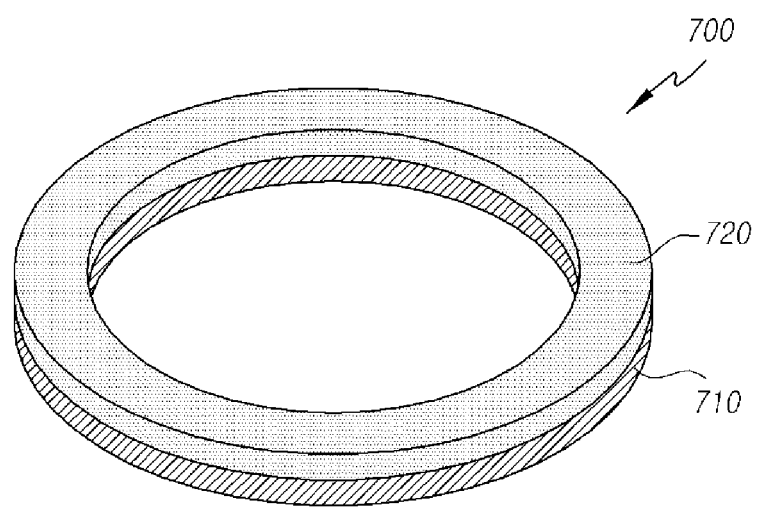
FIGS. 10A and 10B are views illustrating a detailed configuration of a sealing member used for an embodiment of the present disclosure.
Figure 10B:
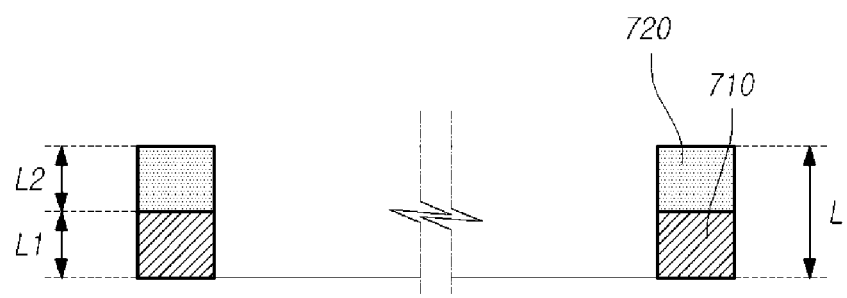

Accordingly, as illustrated in the examples of FIGS. 10A and 10B, the sealing member 700 according to an embodiment may be configured to include a first sealing unit 710 and a second sealing unit 720, which may be formed of two different materials.

FIGS. 10A and 10B are views illustrating a detailed configuration of a sealing member used for an embodiment of the present disclosure.

As illustrated in FIGS. 10A and 10B, the sealing member 700 may be an annular member having a particular height L. The total height L of the sealing member 700 may be substantially equal to the distance between the outer peripheral portion of the sound-generating actuator 600 in FIG. 9A, e.g., the expansion portion 694 of the mold cover 690 and the rear surface of the cover bottom 300.

As illustrated in FIG. 10A, the sealing member 700 may include a first sealing unit 710 in contact with the inner surface of the outer peripheral portion of the sound-generating actuator and having a first elastic modulus, and a second sealing unit 720 extending from the first sealing unit and having a second elastic modulus lower than the first elastic modulus. The first sealing unit 710 may be in contact with or may be bonded to the inner surface of the outer peripheral portion of the sound-generating actuator. The second sealing unit 720 may contact the inner surface of the cover bottom.

The first elastic modulus of the first sealing unit 710 may be about 2 Mpa or more. The first sealing unit 710 may be formed of a relatively hard material, such as a metal or a plastic. On the contrary, the second elastic modulus of the second sealing unit 720 may be about 0.5 Mpa or less. The second sealing unit 720 may be formed of a soft material, such as silicone, rubber, or non-woven fabric. When the sealing member is formed of two materials having different elastic moduli as described above, it is possible to reduce the above-described problems that may occur when the sealing member is formed of a single material, i.e., the noise generation in the case of using a rigid material and the sound leakage phenomenon due to deformation in the case of using a soft material.

When the sealing member 700 having the above-described double structure is used, deformation due to a sound pressure may be reduced because the first sealing unit 710 on the outer peripheral portion of the sound-generating actuator is a rigid material. Further, the second sealing unit 720 formed of a soft material and contacting the rear surface of the cover bottom acts as a damper that absorbs impact caused by the contact with the rear surface of the cover bottom, which is generated during the vibration, thereby reducing the occurrence of a noise. To maximize this effect, it is possible to optimize each of the heights of the first sealing unit 710 and the second sealing unit 720, which will be described below.

First, as illustrated in FIG. 10B, a height L2 of the second sealing unit 720 formed of a soft material may be determined depending on the material of the second sealing unit, but may be set to, e.g., about 3 mm or less. That is, the height L2 of the second sealing unit 720 may be set to a particular value depending on the material, as long as it is possible to block the generation of a noise according to a contact with the cover bottom.

Meanwhile, a height L1 of the first sealing unit 710 formed of a hard material may be variably set according to the height L of the entire sealing member, and may be determined by subtracting the height L2 of the second sealing unit 720, which is determined as a particular value, from the height L of the entire sealing member.

For example, when the distance between the inner surface of the outer peripheral portion of the sound-generating actuator and the rear surface of the cover bottom is, e.g., 10 mm, when the total height L of the sealing member 700 is about 10 mm and the height L2 of the second sealing unit 720 in the form of non-woven fabric may be 1 mm, the height L1 of the first sealing unit 710 may be about 9 mm. When the height L2 of the second sealing unit 720 formed of silicon is 2 mm, the height L1 of the first sealing unit 710 may be about 8 mm.

Thus, by arranging the sealing member between the outer peripheral portion of the sound-generating actuator and the rear surface of the cover bottom, it is possible to reduce sound leakage through the gap S between the sound-generating actuator and the support hole of the cover bottom. Further, it is possible to reduce the occurrence of a noise according to the contact of the sealing member to the cover bottom while reducing sound leakage by forming the sealing member as double sealing units having different elastic moduli, and optimizing the materials (elastic modulus) and the heights of the double sealing units.

Meanwhile, when a mold cover 690, which may be additionally formed on the outer periphery of the sound-generating actuator 600 as illustrated in the examples of FIGS. 9A and 9B, is used in configuring the outer peripheral portion of the sound-generating actuator 600 for disposing the sealing member 700, there is an advantage in that it is possible to mount the sealing member 700 according to the present disclosure without changing the basic structure of the sound-generating actuator 600 that includes the lower plate 610 (or yoke).

FIG. 11A is a cross-sectional view of a display device including a sound-generating actuator and a sealing member according to an embodiment of the present disclosure. FIG.

11B is a perspective view illustrating a sound-generating actuator having an outer peripheral portion formed by an expansion portion formed by expanding a lower plate (or yoke) of the actuator.

As described above, to arrange the sealing member 700, an outer peripheral portion expanded to have a larger diameter than the support hole of the cover bottom may be formed on the sound-generating actuator. Two examples may be considered for forming the outer peripheral portion of the sound-generating actuator.

Figure 11B:
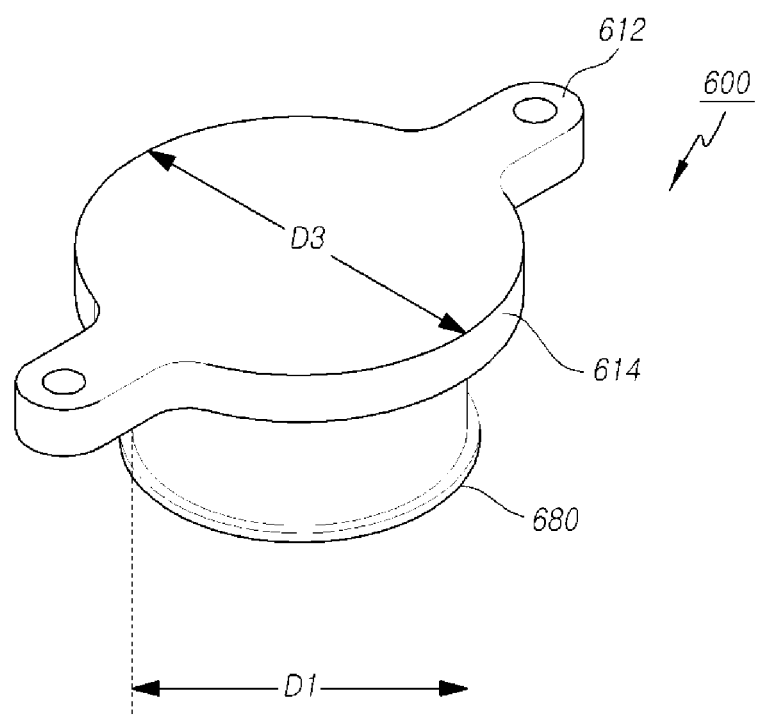
FIG. 11B is a perspective view illustrating a sound-generating actuator having an outer peripheral portion formed by a expansion portion formed by expanding a lower plate (or yoke) of the actuator.

FIGS. 11A and 11B illustrate one of the examples, in which an expansion portion 614 may be formed to integrally extend from the lower plate 610 or the yoke among the components of the sound-generating actuator 600 without using the mold cover 690 of the examples in FIGS. 9A and 9B. That is, when manufacturing the lower plate 610 of the sound-generating actuator 600, an annular protrusion having a diameter larger than the diameter of the remaining portion may be formed on one side, rather than a general cylindrical or cylinder shape, in which the annular protrusion area with the increased diameter may be referred to as a "expansion portion 614."

The expansion portion 614 may form the outer peripheral portion of the sound-generating actuator 600 defined herein. The sealing member 700 may be disposed between the expansion portion 614 and the rear surface of the cover bottom 300.

As illustrated in the FIG. 11B example, when it is presumed that the diameter of the sound-generating actuator 600 is D1, the diameter of the expansion portion 614 may be formed to be D3 that is larger than D1, and extension portions 692 for fixing the actuator 600 by screws may be formed to extend on a portion of the expansion portion 614.

FIG. 11A is a cross-sectional view of the sound-generating actuator in the case in which the sound-generating actuator is fixed to the cover bottom. By using the self-clinching nut 330 fixed to the cover bottom as illustrated in the examples of FIGS. 9A and 9B, the sound-generating actuator 600 having the structure as illustrated in FIG. 11B may be mounted on the cover bottom by a fixing bolt 320.

A sealing member 700 having an annular shape may be disposed between the inner surface of the expansion portion 614, which forms the outer peripheral portion of the sound-generating actuator 600, and the rear surface of the cover bottom 300. The sealing member 700 may have a double-wall structure. Because the detailed configuration of the sealing member 700 used in the examples of FIGS. 11A and 11B is the same as that described above with reference to the examples of FIGS. 10A and 10B, a detailed description will be omitted to avoid a redundant description.

When the lower plate 610 (or yoke) of the actuator 600 is directly expanded to constitute the expansion portion 614 as illustrated in the examples of FIGS. 11A and 11B in configuring the outer peripheral portion of the sound-generating actuator 600 for the arrangement of the sealing member 700, there is an advantage in that the rigidity of the sound-generating actuator 600 can be assured as compared to using a mold cover structure.

Figure 12A:
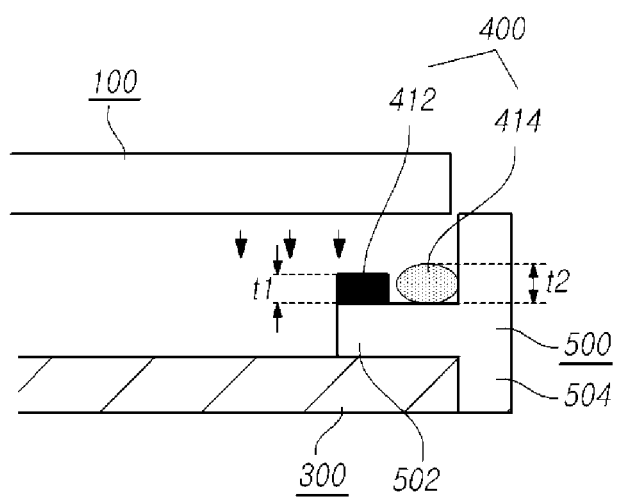
FIGS. 12A to 12C illustrate several examples of the baffle portion formed between a display panel and a middle cabinet, which is one of the support structures of the display panel, to form a space for sound transmission between the display panel as a vibration plate and the cover bottom.
Figure 12B:
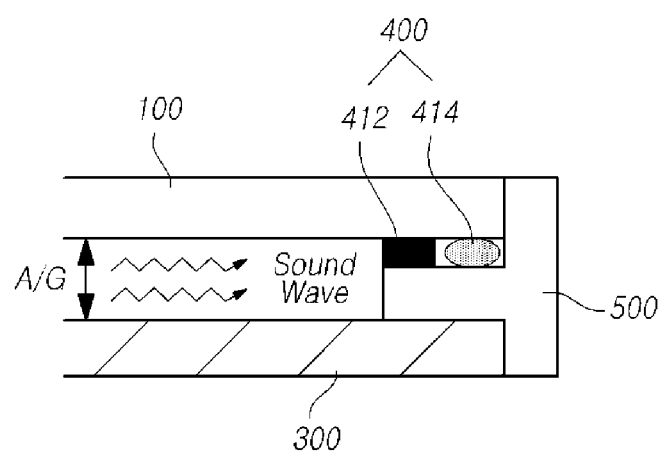
Figure 12C:
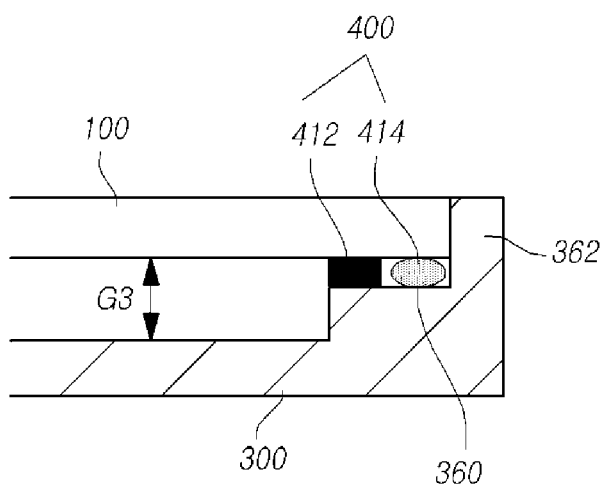

FIGS. 12A to 12C illustrate several examples of the baffle portion formed between a display panel and a middle cabinet, which is one of the support structures of the display panel, to form an air gap space for sound transmission between the display panel as a vibration plate and the cover bottom.

As illustrated in the FIG. 2B example, in a panel vibrating type sound-generating device according to the present embodiment, there should be an air gap space A/G, which allows the panel to be vibrated therein by the sound-generating actuator 200 between the display panel 100 and the support structure (e.g., cover bottom 300). Also, one side of the display panel should be bonded or attached to the support structure of the display panel so that sound waves can be generated when the display panel is vibrated. In particular, generated sound should not leak to the outside through the side surface of the display device.

As such, in the display device according to an embodiment, a particular baffle portion 400 may be formed between the lower surface of the display panel and the supporting structure. For example, a particular section (e.g., an air gap space) may be defined around the sound-generating actuator. At the edge of the section, the baffle portion may be disposed between the lower surface of the display panel and the upper surface of the middle cabinet or the cover bottom. The baffle portion 400 may include an adhesive portion 412, such as a double-sided tape, bonded between the lower surface of the display panel and the upper surface of the support structure of the display device. A sealing portion 414 may be further disposed on the outer periphery of the adhesive portion 412.

In one example, the section in which the baffle portion is formed may be the entire display panel area, e.g., defined by the four outer peripheral sides of the display panel. However, without being limited thereto, the section may be defined as an area, except for an area in which a source PCB is disposed. Further, when two or more sound-generating actuators are provided for implementing stereo sound, stereophonic sound, etc., the section where the baffle portion is formed may be divided into two or more portions.

As illustrated in FIG. 2B, the support structure of the display device may further include a middle cabinet 500 coupled to the cover bottom and configured to seat a part of the display panel therein, in addition to the cover bottom 300 that may cover the entire rear surface of the display panel. The middle cabinet 500 may be a frame-shaped member formed along the periphery of the display panel 100. The middle cabinet 500 may include a horizontal support portion 502 on which a part of the display panel 100 is seated, and a vertical support portion 504 that may be bent to the both sides from the horizontal support portion 502 to cover the side surface of the cover bottom 300 and the side surface of the display panel 100. The middle cabinet 500 may generally have a T-shaped cross-section. The middle cabinet 500 may constitute the side external part of the display device or the set device. In some cases, the middle cabinet 500 may not be used or may be integrally formed with the cover bottom 300.

According to the example of FIG. 12A, the adhesive portion 412 constituting the baffle portion 400 may be a double-sided tape disposed between the upper surface of the horizontal support portion 502 of the middle cabinet 500 and the display panel 100. The adhesive portion 412 may fixedly bond the lower surface of the display panel 100 to the middle cabinet 500.

In one example, a sealing portion 414 constituting the baffle portion may be further disposed on the outer periphery of the adhesive portion 412, and may have an uncompressed thickness or height greater than an uncompressed thickness or height of the adhesive portion 412. The sealing portion 414 may be formed of a material, such as rubber, having high elasticity, and may have an uncompressed thickness t2 that is larger than an uncompressed thickness t1 of the adhesive portion 412, as illustrated in FIG. 12A.

That is, as illustrated in the FIG. 12A example, one side of the adhesive portion 412, which may be a double-sided tape having an uncompressed thickness t1, may be bonded to be disposed on the inner portion of the upper surface of the horizontal support portion 502 of the middle cabinet 500. A sealing portion 414 formed, e.g., of an elastic material, and having an uncompressed thickness larger than t1, may be disposed outside the periphery of the adhesive portion 412.

In this state, when the display panel 100 is attached to the other bonding surface of the adhesive portion 412, the sealing portion 414 having the larger uncompressed thickness may be pressed to a certain degree, so that the display panel 100 and the middle cabinet 500 may be bonded to each other (see FIG. 12B). Accordingly, the sealing property of the air gap area around the sound-generating actuator can be further improved.

By coupling the display panel 100 and the cover bottom 300 with each other while forming the air gap A/G by the thickness of the horizontal support portion 502 of the middle cabinet and the adhesive portion 412 as illustrated in the FIG. 12B example, it is possible to secure a vibration space in which the display panel can generate sound and to reduc the sound waves generated in the vibration space from flowing out to the outside along the side surface of the display device. By forming the baffle portion 400 disposed at the edge of the air gap space A/G in a double structure of the adhesive portion 412 and the sealing portion 414, and by forming the sealing portion 414 to have a larger uncompressed thickness, the sealing property of the air gap space A/G can be further improved so that the leakage of sound can be further blocked.

It should be understood that the middle cabinet 500 herein may be expressed by other terms, such as a guide panel, a plastic chassis, a p-chassis, a support main, a main support, and a mold frame, and may include any type of members, including, for example, a square frame-like structure that has a sectional shape having a plurality of bent portions and is connected to the cover bottom to be used to support the display panel and the baffle portion. The middle cabinet 500 may be formed of a molding material, e.g., of a synthetic resin, such as polycarbonate, and may be manufactured through an injection molding method, but embodiments are not limited to these examples.

As described above, although the middle cabinet may be used to support a gap between the cover bottom and the display panel, the middle cabinet may not be a necessary structure, i.e., it may be optional. That is, as illustrated in the FIG. 12C example, it is possible to form a structure in which the cover bottom 300 is formed as a structure for supporting one side of a display panel 100 while forming a side exterior of the display device without using a middle cabinet. In this case, a cover bottom 300 may be provided in which a stepped portion 360 protruding upward from the base surface is formed on one side of the cover bottom 300, and a side support portion 362 may be formed to extend in the vertical direction outside the stepped portion 360.

A portion of the edge of the display panel 100 may be seated on and bonded to the stepped portion 360 of the cover bottom 300, and the side support portion 362 of the cover bottom 300 may surround and protect the side surface of the display panel 100. As a result, the cover bottom 300 may form the exterior portion of the entire side and rear surfaces of the display device. In this structure, to configure the baffle portion 400 for sound generation or the like in this configuration, an adhesive portion 412, e.g., in the form of a double-sided tape, may be disposed inside the stepped portion 360 of the cover bottom 300. The sealing portion 414 having an uncompressed thickness larger than an uncompressed thickness of the adhesive portion 412 may be disposed outside the adhesive portion 412.

In this state, the display panel 100 may be seated on the stepped portion 360 of the cover bottom 300, and may be bonded to one surface of the adhesive portion 412, thereby being coupled to the cover bottom 300. Then, the sealing portion 414 may be squeezed so that sealing of the air gap space G3 for sound transmission is ensured.

With the example of FIG. 12C, an intermediate support structure, such as a middle cabinet, may be omitted to simplify the structure. By forming the baffle portion 400 disposed at the edge of the air gap space to have a double structure of the adhesive portion 412 and the sealing portion 414, and by forming the sealing portion 414 to have a larger uncompressed thickness, it is possible to secure a vibration space in which the display panel can generate sound, and to reduce the sound waves generated inside the vibration space from being leaked to the outside along the side surface of the display panel 100.

In an embodiment, the thickness of the air gap space, that is, the distance G3 between the display panel 100 and the cover bottom 300 in the air gap space, may be adjusted, e.g., to about 1.0 mm to 3.0 mm, but may be set to a different range according to the vibration degree of the display panel without being limited thereto. However, because there may be a need to reduce the thickness of the display device, it may be desirable to minimize the thickness G3 of the air gap space in consideration of the vibration amount of the display panel, the sound range to be output, the output amount, and the like by the sound-generating actuator. In an embodiment, experimental results have confirmed that it is optimal to set the thickness G3 of the air gap space to about 2.0 mm.

Figure 13:
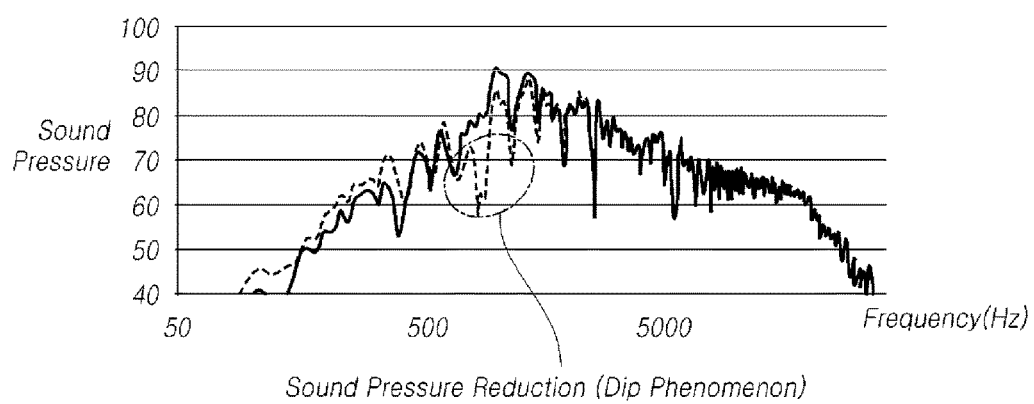
FIG. 13 is a graph illustrating a sound output characteristic when a sealing member according to an embodiment of the present disclosure is used.

FIG. 13 is a graph illustrating a sound output characteristics when a sealing member according to an embodiment of the present disclosure is used.

In FIG. 13, the dotted line represents a sound output amount for each frequency when the sealing member according to the present disclosure is not used, as illustrated in the examples of FIGS. 6A and 6B and FIGS. 7A and 7B. The solid line represents a case in which the sealing member, e.g., the sealing member 700, according to the present disclosure is used.

As indicated by the dotted line in FIG. 13, it can be seen that when the sealing member according to the present disclosure is not used, a dip phenomenon (in the dotted-and-dashed circle), in which sound output (sound pressure) is drastically decreased at a specific sound range (e.g., about 500 Hz to 1000 Hz), is generated by leakage sound through the gap S between the sound-generating actuator and the support hole of the cover bottom, and reflected sound thereof. On the contrary, as indicated by the solid line in FIG. 13, it can be seen that when the sealing member according to the present disclosure is used, the sound pressure reduction (dip phenomenon) at a specific frequency may be reduced. As a result, uniform sound quality can be implemented in the entire sound range.

As described above, according to the present embodiment, by fixedly inserting the sound-generating actuator into the support hole formed in the support structure of the display device in configuring the display device including the panel vibration type sound-generating device, and disposing a sealing member for reducing reflected sound between the inner surface of the outer peripheral portion of the sound-generating actuator and the outer surface of a support structure, it is possible to reduce sound leakage through the gap S between the sound-generating actuator and the support hole of the support structure.

It is possible to reduce the occurrence of a noise according to the contact of the sealing member to the cover bottom while reducing sound leakage by forming the sealing member for reducing reflected sound as double sealing units having different elastic modulus, and optimizing the materials (elastic modulus) and the heights of the double sealing units.

According to one or more example embodiments of the present disclosure, a display device may include a display panel configured to display an image, a cover bottom configured to cover the display panel, a sound-generating actuator supported by the cover bottom, the sound-generating actuator configured to vibrate the display panel to generate sound, and a sealing member between an outer peripheral portion of the sound-generating actuator and an outer surface of the cover bottom.

According to one or more example embodiments of the present disclosure, the sound-generating actuator may include a lower plate connected to the cover bottom, a magnet on the lower plate, a center pole at a center of the lower plate, a bobbin surrounding a periphery of the center pole, the bobbin having a tip end configured to vibrate the display panel, and a coil wound around an outer periphery of the bobbin.

According to one or more example embodiments of the present disclosure, the outer peripheral portion of the sound-generating actuator may include an expansion portion radially extending integrally with the lower plate, and the sealing member may be between the expansion portion and a rear surface of the cover bottom.

According to one or more example embodiments of the present disclosure, the outer peripheral portion of the sound-generating actuator may include a mold cover surrounding at least a side surface of the lower plate, and the sealing member may be between a portion of the inner surface of the mold cover and a rear surface of the cover bottom.

According to one or more example embodiments of the present disclosure, the sealing member may include a first sealing unit in contact with the inner surface of the outer peripheral portion of the sound-generating actuator, the first sealing unit having a first elastic modulus, and a second sealing unit extending from the first sealing unit, the second sealing unit being on the rear surface side of the cover bottom, the second sealing unit having a second elastic modulus that is lower than the first elastic modulus.

According to one or more example embodiments of the present disclosure, the first elastic modulus may be about 2 Mpa or more, and the second elastic modulus may be about 0.5 Mpa or less.

According to one or more example embodiments of the present disclosure, the display device may further include a self-clinching nut fixed to the cover bottom, the outer peripheral portion of the sound-generating actuator may be fixed to the self-clinching nut by a fixing bolt.

According to one or more example embodiments of the present disclosure, at least one of an adhesive member configured to bond the bobbin to the display panel and a vibration transmission plate integrally disposed with the adhesive member may be disposed on the tip end of the bobbin.

According to one or more example embodiments of the present disclosure, the display device may further include a baffle portion between the display panel and the cover bottom.

According to one or more example embodiments of the present disclosure, the baffle portion may include one or both of an adhesive portion at an edge of the space and bonded to the display panel, and a sealing portion. According to one or more example embodiments of the present disclosure, an uncompressed thickness of the sealing portion may be larger than an uncompressed thickness of the adhesive portion.

According to one or more example embodiments of the present disclosure, the display device may further include an upper plate above the lower plate, an outer frame on the upper plate, and a damper between the bobbin and the outer frame. According to one or more example embodiments of the present disclosure, the magnet may be at an exterior of the bobbin and outside of the coil. According to one or more example embodiments of the present disclosure, the magnet may be at an interior of the bobbin and inside of the coil.

According to one or more example embodiments of the present disclosure, a display device may include a display panel configured to display an image, a cover bottom configured to cover the display panel, and a sound-generating actuator supported by the cover bottom, the sound-generating actuator having a tip end configured to vibrate the display panel to generate sound.

According to one or more example embodiments of the present disclosure, the display device may further include a sealing member between an outer peripheral portion of the sound-generating actuator and an outer surface of the cover bottom.

According to one or more example embodiments of the present disclosure, the sound-generating actuator may include a lower plate connected to the cover bottom, a magnet on the lower plate, a center pole at a center of the lower plate, a bobbin surrounding a periphery of the center pole, the bobbin having a tip end configured to vibrate the display panel, and a coil wound around an outer periphery of the bobbin.

According to one or more example embodiments of the present disclosure, the outer peripheral portion of the sound-generating actuator may include an expansion portion radially extending integrally with the lower plate, and the sealing member may be between the expansion portion and a rear surface of the cover bottom.

According to one or more example embodiments of the present disclosure, the outer peripheral portion of the sound-generating actuator may include a mold cover surrounding at least a side surface of the lower plate, and a sealing member may be between a portion of the inner surface of the mold cover and a rear surface of the cover bottom.

According to one or more example embodiments of the present disclosure, the magnet may be at an exterior of the bobbin and outside of the coil. According to one or more example embodiments of the present disclosure, the magnet may be at an interior of the bobbin and inside of the coil.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A display device, comprising:
   a display panel configured to display an image;
   a cover bottom configured to cover the display panel;
   a sound-generating actuator supported by the cover bottom, the sound-generating actuator configured to vibrate the display panel to generate sound; and
   a sealing member between an outer peripheral portion of the sound-generating actuator and an outer surface of the cover bottom, wherein the sound-generating actuator comprises:
a lower plate connected to the cover bottom,
a magnet on the lower plate,
a center pole at a center of the lower plate,
a bobbin surrounding a periphery of the center pole, the bobbin having a tip end configured to vibrate the display panel, and
a coil wound around an outer periphery of the bobbin.

2. The display device of claim 1, wherein:
the outer peripheral portion of the sound-generating actuator includes an expansion portion radially extending integrally with the lower plate; and
the sealing member is between the expansion portion and a rear surface of the cover bottom.

3. The display device of claim 1, wherein:
the outer peripheral portion of the sound-generating actuator includes a mold cover surrounding at least a side surface of the lower plate; and
the sealing member is between a portion of the inner surface of the mold cover and a rear surface of the cover bottom.

4. The display device of claim 1, wherein the sealing member comprises:
a first sealing unit in contact with the inner surface of the outer peripheral portion of the sound-generating actuator, the first sealing unit having a first elastic modulus; and
a second sealing unit extending from the first sealing unit, the second sealing unit being on the rear surface side of the cover bottom, the second sealing unit having a second elastic modulus that is lower than the first elastic modulus.

5. The display device of claim 4, wherein:
the first elastic modulus is about 2 Mpa or more; and
the second elastic modulus is about 0.5 Mpa or less.

6. The display device of claim 1, further comprising:
a self-clinching nut fixed to the cover bottom,
wherein the outer peripheral portion of the sound-generating actuator is fixed to the self-clinching nut by a fixing bolt.

7. The display device of claim 1, wherein at least one of an adhesive member configured to bond the bobbin to the display panel and a vibration transmission plate integrally disposed with the adhesive member is disposed on the tip end of the bobbin.

8. The display device of claim 1, further comprising a baffle portion between the display panel and the cover bottom, the baffle portion forming a space between the display panel and the cover bottom.

9. The display device of claim 8, wherein the baffle portion comprises one or both of:
an adhesive portion at an edge of the space and bonded to the display panel; and
a sealing portion.

10. The display device of claim 9, wherein an uncompressed thickness of the sealing portion is larger than an uncompressed thickness of the adhesive portion.

11. The display device of claim 1, further comprising:
an upper plate above the lower plate;
an outer frame on the upper plate; and
a damper between the bobbin and the outer frame.

12. The display device of claim 1, wherein the magnet is at an exterior of the bobbin and outside of the coil.

13. The display device of claim 1, wherein the magnet is at an interior of the bobbin and inside of the coil.

14. A display device, comprising:
a display panel configured to display an image;
a cover bottom configured to cover the display panel;
a sound-generating actuator supported by the cover bottom, the sound-generating actuator having a tip end configured to vibrate the display panel to generate sound; and
a sealing member between an outer peripheral portion of the sound-generating actuator and an outer surface of the cover bottom,
wherein the sound-generating actuator comprises:
a lower plate connected to the cover bottom;
a magnet on the lower plate;
a center pole at a center of the lower plate;
a bobbin surrounding a periphery of the center pole, the bobbin having a tip end configured to vibrate the display panel; and
a coil wound around an outer periphery of the bobbin.

15. The display device of claim 14, wherein:
the outer peripheral portion of the sound-generating actuator includes an expansion portion radially extending integrally with the lower plate; and
the sealing member is between the expansion portion and a rear surface of the cover bottom.

16. The display device of claim 14, wherein:
the outer peripheral portion of the sound-generating actuator includes a mold cover surrounding at least a side surface of the lower plate; and
a sealing member is between a portion of the inner surface of the mold cover and a rear surface of the cover bottom.

17. The display device of claim 14, wherein the magnet is at an exterior of the bobbin and outside of the coil.

18. The display device of claim 14, wherein the magnet is at an interior of the bobbin and inside of the coil.

* * * * *